US006186949B1

(12) United States Patent
Hatfield et al.

(10) Patent No.: US 6,186,949 B1
(45) Date of Patent: *Feb. 13, 2001

(54) METHOD AND APPARATUS FOR THREE-DIMENSIONAL FLOW IMAGING USING CODED EXCITATION

(75) Inventors: William Thomas Hatfield, Schenectady; Richard Yung Chiao, Clifton Park, both of NY (US)

(73) Assignee: General Electric Company, Schenectady, NY (US)

(*) Notice: Under 35 U.S.C. 154(b), the term of this patent shall be extended for 0 days.

This patent is subject to a terminal disclaimer.

(21) Appl. No.: 09/411,207

(22) Filed: Oct. 4, 1999

Related U.S. Application Data

(63) Continuation-in-part of application No. 09/299,033, filed on Apr. 23, 1999, which is a continuation-in-part of application No. 09/065,212, filed on Apr. 23, 1998, which is a continuation-in-part of application No. 09/052,789, filed on Mar. 31, 1998, now abandoned.

(51) Int. Cl.[7] ........................................................ A61B 8/00
(52) U.S. Cl. ........................ 600/443; 600/447; 128/916
(58) Field of Search ........................................ 600/437, 441, 600/443, 447, 458; 128/916; 73/602; 367/138

(56) References Cited

U.S. PATENT DOCUMENTS

| 4,276,885 | 7/1981 | Tickner et al. ............... 128/660 |
| 5,329,929 | * 7/1994 | Sato et al. ..................... 600/441 |
| 5,456,257 | 10/1995 | Johnson et al. ............... 600/458 |
| 5,632,277 | 5/1997 | Chapman et al. .......... 128/660.07 |
| 5,706,819 | 1/1998 | Hwang et al. ............. 128/662.02 |

(List continued on next page.)

FOREIGN PATENT DOCUMENTS 0770352A 2/1997 (EP).

OTHER PUBLICATIONS

Torp et al., "Comparison Between Cross–Correlation and Auto–Correlation Technique in Color Flow Imaging," Proc. 1993 IEEE Ultrason. Symp., pp. 1039–1042.

Thomas et al., "An improved Wall Filter for Flow Imaging of Low Velocity Flow," Porc. 1994 IEEE Ultrason. Symp., pp. 1701–1704.

Hein et al., "Current Time–Domain Methods for Assessing Tissue Motion by Analysis from Reflected Ultrasound Echoes–A Review," IEEE Trans. Ultrason., Ferroelec., Frequ. Contr., vol. 40, No. 2, Mar. 1993, pp. 84–102.

de Jong et al., "Characteristics of Contrast Agents and 2D Imaging," 1996 IEEE Ultrasonics Symposium, pp. 1449–1458.

(List continued on next page.)

Primary Examiner—Marvin M. Lateef
Assistant Examiner—Ali M. Imam
(74) Attorney, Agent, or Firm—Marvin Snyder; Douglas E. Stoner

(57) ABSTRACT

In performing three-dimensional flow imaging using coded excitation and wall filtering, a coded sequence of broadband pulses (centered at a fundamental frequency) is transmitted multiple times to a particular transmit focal position. On receive, the receive signals acquired for each firing are compressed and bandpass filtered to isolate a compressed pulse centered at the fundamental frequency. The compressed and isolated signals are then wall filtered to extract the flow imaging data. This process is repeated for a multiplicity of transmit focal positions in each of a multiplicity of scanning planes to acquire a volume of flow imaging data. Volume rendered images are then produced which allow the user to view the data volume from any angle. In addition, the data volume may be reformatted to produce two-dimensional images of arbitrary cut planes through the data volume.

40 Claims, 11 Drawing Sheets

U.S. PATENT DOCUMENTS

| | | | |
|---|---|---|---|
| 5,724,976 | | 3/1998 | Mine et al. ............................ 600/459 |
| 5,833,613 | | 11/1998 | Averkiou et al. ..................... 600/440 |
| 5,934,288 | * | 8/1999 | Avila et al. ........................... 128/916 |
| 5,938,611 | * | 8/1999 | Muzilla et al. ....................... 600/455 |
| 5,961,463 | * | 10/1999 | Rhyne et al. ......................... 600/458 |
| 5,964,706 | * | 10/1999 | Mo et al. .............................. 600/443 |
| 5,980,459 | * | 11/1999 | Chiao et al. .......................... 600/447 |
| 5,984,869 | * | 11/1999 | Chiao et al. .......................... 600/437 |
| 6,030,344 | * | 2/2000 | Guracar et al. ....................... 600/447 |
| 6,042,545 | * | 3/2000 | Hossack et al. ...................... 600/443 |

OTHER PUBLICATIONS

Ishihara et al., "Path Lines in Blood Flow Using High Speed Digital Subtraction Echography," Proc. 1992 IEEE Ultrason. Symp., pp. 1277–1280.

Ishihara et al., "High–Speed Digital Subtraction Echography: etc.," Proc. 1990 IEEE Ultrason. Symp., pp. 1473–1476.

de Jong et al., "Principles and Recent Developments in Ultrasound Contrast Agents," Ultrasonics, vol. 29, pp. 324–330 (1991).

Newhouse et al., "Second Harmonic Doppler Ultrasonic Blood Perfusion Measurement," Proc. 1992 IEEE Ultrason. Symp., pp. 1175–1177.

Burns et al., "Harmonic Power Mode Doppler Using Microbubble Contrast Agents: etc.," Proc. IEEE 1994 Ultrason. Symp., pp. 1547–1550.

Averkiou et al., "A New Imaging Technique Based on the Nonlinear Properties of Tissue," Proc. 1997 IEEE Ultrason. Symp.

Uhlendrf, "Physics of Ultrasound Contrast Imaging: etc.," IEEE Trans. Ultrason. Ferroele. & Freq. control, vol. 41, No. 1, pp. 70–79, Jan. (1994).

Shahnazi et al., "Use of Contrast Agents in Ultrasound," Proc. 1994 Ultrason. Symp., pp. 85–87.

Wang et al., "Contrast Medium Assisted Fluid/Flow Measurement," IEEE Trans. Ultrason. Ultrasonic. Ferroele. & Freq. control, vol. 42, No. 2, pp. 309–315, Mar. (1995).

* cited by examiner

METHOD AND APPARATUS FOR THREE-DIMENSIONAL FLOW IMAGING USING CODED EXCITATION

RELATED PATENT APPLICATIONS

This is a Continuation-in-Part of U.S. patent application Ser. No. 09/299,033 filed on Apr. 23, 1999, which in turn is a Continuation-in-Part of U.S. patent application Ser. No. 09/065,212 filed on Apr. 23, 1998, which is a Continuation-in-Part of U.S. patent application Ser. No. 09/052,789 filed on Mar. 31, 1998, now abandoned. Each of the aforesaid U.S. patent applications is hereby incorporated by reference.

FIELD OF THE INVENTION

This invention generally relates to ultrasound imaging systems. In particular, the invention relates to methods and apparatus for three-dimensional imaging of blood flow and contrast agents.

BACKGROUND OF THE INVENTION

Conventional ultrasound scanners create two-dimensional gray-scale (B-mode) images which represent a thin slice through an area of anatomy. Flow information can also be extracted by detecting the Doppler shift between transmitted and returned ultrasound pulses. A conventional ultrasound system displays flow as either average Doppler power (power Doppler imaging) or average velocity (commonly referred to as color flow imaging). A flow image is conventionally displayed as an overlay on a B-mode image.

The transmitted pulses in power Doppler and color flow imaging are typically more narrowband than B-mode pulses in order to gain Doppler sensitivity. Operating on a packet of as many as 16 transmits, a high-pass wall filter rejects echoes from slower-moving tissue or vessel walls to reduce the signal dynamic range. The number of wall filter output samples per packet is given by (N−W+1), where N is packet size and W is wall filter length. Subsequently, the instantaneous Doppler power is computed as the magnitude squared of each wall filter quadrature output and the average of all outputs yields the average Doppler power. Alternatively, the average velocity is computed from the wall filter quadrature output based on the Doppler principle or time delay. The Kasai autocorrelation algorithm or a cross-correlation algorithm can be used to estimate the average flow velocity.

Although conventional color-flow imaging has very good flow sensitivity, the ability to see physical flow is limited by its limited dynamic range (which is partially dependent on the compression curve), limited resolution (due to narrow-band pulses), limited frame rate (due to large packet sizes), and axialonly flow sensitivity (which is dictated by the reliance on the Doppler effect). In addition, conventional color-flow imaging suffers from artifacts such as aliasing, color blooming and bleeding.

If the ultrasound probe is swept over an area of body and the slices are stored in memory, a three-dimensional data volume can be acquired containing both the B-mode and flow information. The data volume can be used to project a three-dimensional view of the area of interest. The quality of three-dimensional projections of color flow and power Doppler data (either separately or combined with B-mode data) suffer for the aforementioned reasons, namely, reduced acoustic frame rate, Doppler sensitivity, reduced flow resolution, and "flash" artifacts. There is need for a method of performing three-dimensional flow imaging which is not afflicted with the drawbacks associated with Doppler flow imaging.

Conventional ultrasound images are formed from a combination of fundamental and harmonic signal components, the latter of which are generated in a nonlinear medium such as tissue or a blood stream containing contrast agents. In certain instances ultrasound images may be improved by suppressing the fundamental and emphasizing the harmonic signal components.

Contrast agents have been developed for medical ultrasound to aid in diagnosis of traditionally difficult-to-image vascular anatomy. The agents, which are typically microbubbles whose diameter is in the range of 1–10 micrometers, are injected into the blood stream. Since the backscatter signal of the microbubbles is much larger than that of blood cells, the microbubbles are used as markers to allow imaging of blood flow. One method to further isolate echoes from these agents is to use the (sub)harmonic components of the contrast echo, which is much larger than the harmonic components of the surrounding tissue without contrast agent. Flow imaging of (sub)harmonic signals has largely been performed by transmitting a narrowband signal at frequency $f_0$ and receiving at a band centered at frequency $2f_0$ (second harmonic) or at frequency $f_0/2$ (subharmonic) followed by conventional color flow processing. This approach has all the limitations of a conventional color flow system, namely, low resolution, low frame rate and flow sensitivity only in the axial direction.

In medical diagnostic ultrasound imaging, it is also desirable to optimize the signal-to-noise ratio (SNR). Additional SNR can be used to obtain increased penetration at a given imaging frequency or to improve resolution by facilitating ultrasonic imaging at a higher frequency. Coded excitation is a well-known radar technique used to increase signal-to-noise ratio in situations where the peak power of a transmitted signal cannot be increased but the average power can. This is often the situation in medical ultrasound imaging, where system design limitations dictate the peak amplitude of the signal driving the transducer. In this situation, longer signals can be used to deliver higher average power values, and temporal resolution is restored by correlating the return signal with a matched filter. Binary codes, or codes that can be easily represented digitally as a series of digits of +1, −1 or 0, are preferred. Binary codes are also preferred because they contain the most energy for a given peak amplitude and pulse duration.

SUMMARY OF THE INVENTION

A method and apparatus for three-dimensional imaging of blood flow and contrast agents with high resolution, high frame rate, high SNR/dynamic range and flow sensitivity in all directions provides clinical benefits including clear visualization of complex hemodynamics, residual lumen in stenosis and thrombus motion. High resolution is achieved by using broadband pulses, while high frame rate is achieved by using small packet sizes. High SNR/dynamic range is maintained by using coded excitation. Flow sensitivity in the range direction is highest and arises from pulse-to-pulse RF decorrelation, while flow sensitivity in the cross-range direction is due to pulse-to-pulse amplitude decorrelation as a group of reflectors (e.g. blood or contrast agents) flows across the beam profile.

In the method disclosed herein, a small packet of coded broadband pulses is transmitted with a given pulse repetition interval to a transmit focal position. The backscattered signals from this sequence of firings are filtered in slow time to remove echoes from stationary or slower-moving reflectors along the transmit path. The packet size is small (under six firings) to achieve high frame rate, though with the undesirable side effect of reduced SNR. In the preferred embodiment, SNR is recovered by using coded excitation. The slow-time filtering is preferably performed by a highpass FIR (finite impulse response) or IIR (infinite impulse response) wall filter. The wall filter increases the flow signal-to-clutter ratio, which may be further increased by administering a contrast agent to the patient prior to imaging. A slice of flow imaging data is acquired by scanning the transmit focal position across a plane.

The foregoing scanning process is repeated for each of a multiplicity of scan planes. An image frame is acquired for each scan plane while the ultrasound probe is being swept over, i.e., moved relative to, the body being scanned. The multiple image frames of flow imaging data acquired during the sweep of the probe form a three-dimensional data volume. Any one of various volume rendering techniques (e.g., maximum or average pixel projection, composite or surface) can be used to reconstruct projected images onto various imaging planes. In particular, the host computer projects the pixel flow imaging data in the data volume onto a plurality of rotated image planes. The projected data resulting from each projection can then be displayed.

In accordance with a preferred embodiment of the invention, a coded sequence of broadband pulses (centered at a fundamental frequency) is transmitted multiple times to a particular transmit focal position, each coded sequence constituting one firing. On receive, the receive pulses acquired for each firing are compressed and bandpass filtered, e.g., to isolate a compressed pulse centered at the fundamental frequency. The compressed and isolated signals are then high pass filtered across firings using a wall filter. The wall filtered signals are used to image blood flow without injecting contrast agents into the blood.

In accordance with another preferred embodiment of the invention, contrast agents such as gas-filled microbubbles are injected into the blood to serve as markers for imaging blood flow. As in the previously described embodiment, a coded sequence of broadband pulses is transmitted multiple times to a particular transmit focal position. Fundamental and (sub)harmonic signals are generated from interaction between the transmitted ultrasound pulses and the propagation medium, especially the injected contrast agents. On receive, the receive signals are decoded and bandpass filtered to isolate the fundamental signals. The isolated fundamental signals are then high-pass filtered across firings using a wall filter.

As a result of the coded excitation and wall filtering, fundamental signals reflected from non-stationary tissue or flow regions along the transmit path can be extracted and displayed.

In accordance with further preferred embodiments of the invention, the flow image may be combined with a stationary tissue (i.e., B-mode) image acquired by detecting either the fundamental or (sub)harmonic signal components, either by summation or as an overlay in order to provide anatomical landmarks. An advantage of the overlay is that it may be done in color so that the flow regions stand out clearly. However, this method requires more complex display hardware and additional firings (to acquire imaging data representing stationary tissue) beyond those used for flow imaging. Furthermore, the flash artifacts are severe. Injection of the background B-mode image by summation (either coherent or incoherent) results in more benign flash artifacts. By using a wall filter feedthrough method, a B-mode image may be added with (for a harmonic B-mode image) or without (for a fundamental B-mode image) additional firings. When separate firings are used for the flow imaging mode and the B mode, the firings are interleaved and the flow signals may be thresholded separately from the B-mode signals prior to display.

The inventive method differs from conventional power Doppler and color flow velocity imaging in several respects. For example, the inventive method does not extract the Doppler signal and so is able to use broadband pulses. Also, the inventive method does not require either baseband data (although it can use baseband data) or velocity estimation. Third, the inventive method uses a wall filter with a single output sample and displays that quantity directly (without averaging), which is distinct from both conventional power Doppler and color flow velocity imaging. Finally, the summation method of providing a B-mode background is simpler (less display hardware is required), more efficient (the feedthrough method does not require additional transmits to acquire a fundamental B-mode image), and more effective (more benign flash artifacts) than the conventional overlay method.

DETAILED DESCRIPTION OF THE PREFERRED EMBODIMENTS

Figure 1:
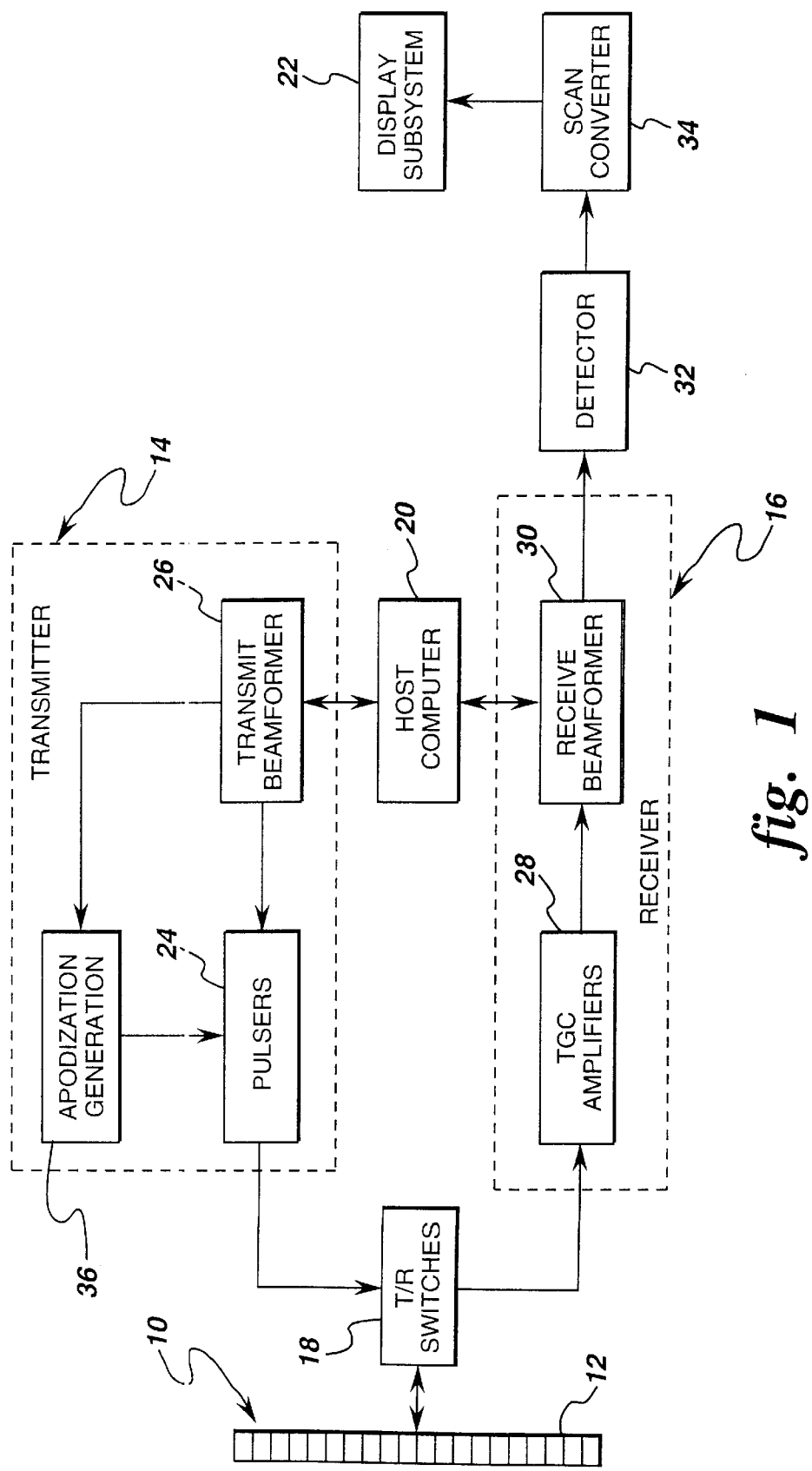
FIG. 1 is a block diagram generally depicting various subsystems of a conventional ultrasound imaging system.

A conventional ultrasonic imaging system is depicted in FIG. 1. The system comprises a transducer array 10 having a plurality of separately driven transducer elements 12, each of which produces a burst of ultrasonic energy when energized by a pulsed waveform produced by a transmitter 14. The ultrasonic energy reflected back to transducer array 10 from the object under study is converted to an analog electrical signal by each receiving transducer element 12 and applied separately to a receiver 16 through a set of transmit/receive (T/R) switches 18. Transmitter 14 and receiver 16 are operated under control of a host computer or master controller 20 responsive to commands supplied by a human operator via an operator interface (not shown). A complete scan is performed by acquiring a series of echoes in which transmitter 14 is gated ON momentarily to energize each transducer element 12, and the subsequent echo signals produced by each transducer element 12 are applied to receiver 16. Receiver 16 converts the analog echo signals to digital signals and combines the respective digital signals derived from each transducer element to produce a single beamsummed signal which is used to produce a line in an image displayed by a display subsystem 22.

Under the direction of host computer 20, transmitter 14 drives transducer array 10 such that the ultrasonic energy is transmitted as a directed focused beam. To accomplish this, respective time delays are imparted to a multiplicity of pursers 24 by a transmit beamformer 26. Host computer 20 determines the conditions under which the acoustic pulses will be transmitted. With this information, transmit beamformer 26 determines the timing and amplitudes of each of the transmit pulses to be generated by pursers 24. The amplitudes of each transmit pulse are generated by an apodization generation circuit 36, such as a high-voltage controller that sets the power supply voltage to each pulser. Pulsers 24 in turn send the transmit pulses to each of elements 12 of transducer array 10 via T/R switches 18, which protect time-gain compensation (TGC) amplifiers 28 from the high voltages which may exist at the transducer array. The apodization weightings are selected to achieve optimal compromise between transmit power and sidelobe level. Weightings are generated by apodization generation circuit 36, which may comprise a set of digital-to-analog converters that take the weighting data from transmit beamformer 26 and apply it to pulsers 24. By appropriately adjusting the transmit focus time delays in a conventional manner and also adjusting the transmit apodization weightings, a multiplicity of ultrasonic waves transmitted by individual transducer elements can be combined to form a directed and focused transmit beam. The apodization weightings and the transmit focus time delays may be set by the host computer based on system programming and operator inputs.

Each burst of ultrasonic energy is reflected from objects located at successive ranges along each transmit beam. The resulting echo signals are sensed separately by each transducer element 12 and a sample of the echo signal magnitude at a particular point in time represents the amount of reflection occurring at a specific range. Due to the differences in the propagation paths between a reflecting point and each transducer element 12, the echo signals are not detected simultaneously and their amplitudes are not equal. Receiver 16 amplifies the separate echo signals via a respective TGC amplifier 28 in each receive channel. TGC is carried out by increasing or decreasing gain as a function of depth. The amount of amplification provided by the TGC amplifiers is controlled by a TGC circuit (not shown), which is set by the host computer and manual operation of potentiometers. The amplified echo signals are then fed to a receive beamformer 30.

Under the direction of host computer 20, receive beamformer 30 tracks the direction of the transmitted beam. Receive beamformer 30 imparts the proper time delays and receive apodization weightings to each amplified echo signal and sums these signals to provide an echo signal which accurately represents the total ultrasonic energy reflected from a point located at a particular range in a particular transmit direction. The receive focus time delays are computed in real-time using specialized hardware, or are read from a lookup table. The receive channels also have circuitry for filtering the received pulses. The receive apodization weightings and receive focus time delays may be set by the host computer based on system programming and operator inputs.

The time-delayed receive signals are then summed and provided to a signal processor or detector 32 which converts the summed receive signals to display data. In the typical gray-scale display, the display data are the envelope of the signal with some additional processing, such as edge enhancement and logarithmic compression. For RF data, the envelope can be detected using a low-pass filter; for baseband data, the envelope can be detected using an envelope detector which produces a signal representing $(I^2+Q^2)^{1/2}$, where I is the in-phase signal component and Q is the quadrature signal component of the baseband data.

Scan converter 34 receives the display data from detector 32 and converts the data into the desired image for display. In particular, scan converter 34 converts the acoustic image data from polar coordinate (R-θ) sector format or Cartesian coordinate linear array to appropriately scaled Cartesian coordinate display pixel data at the video rate. The scan-converted acoustic data are then provide d for display by display subsystem 22, which images the time-varying amplitude of the envelope of the signal as a gray scale. A respective scan line is displayed for each transmit beam.

Figure 2:
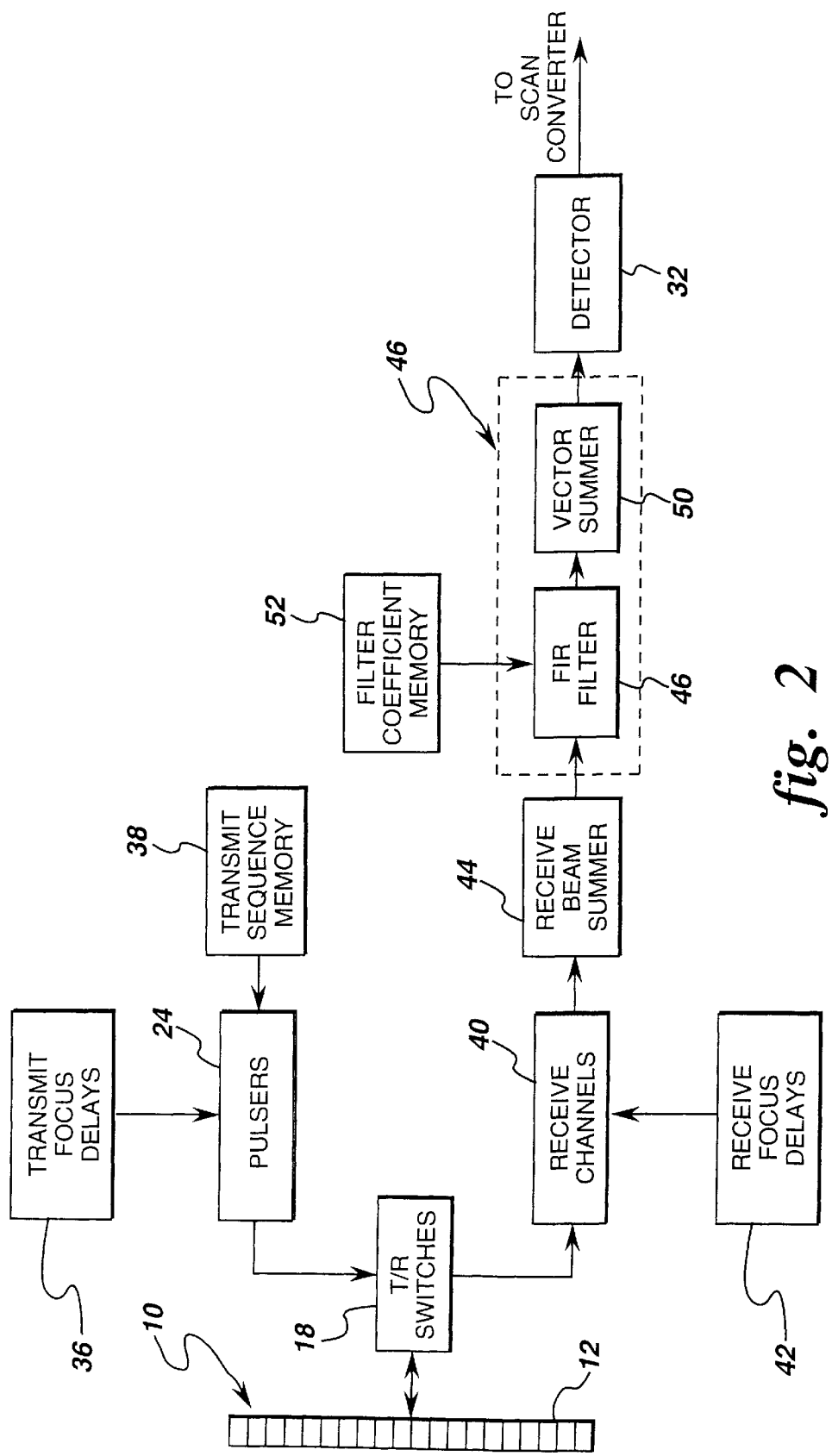
FIG. 2 is a block diagram showing an ultrasound imaging system in accordance with one preferred embodiment of the invention.

FIG. 2 shows an ultrasound flow imaging system in accordance with one preferred embodiment of the invention. Each transducer element in the transmit aperture is pulsed N times (where N is preferably 6 or less) using the same coded waveform by supplying the same transmit sequence from a memory 38 into each pulser N times. Pulsers 24 drive elements 12 of transducer array 10 such that the ultrasonic energy produced is directed or steered in a beam for each transmit firing. To accomplish this, transmit focus time delays 36 are imparted to the respective pulsed waveforms produced by the pulsers in response to the transmit sequence from memory 38. By appropriately adjusting the transmit focus time delays in a conventional manner, the ultrasonic beam can be focused at a desired transmit focal position. The N pulses are transmitted to the transmit focal position with a specified pulse repetition interval (PRI). The transmit sequences are supplied by the host computer based on system programming and operator inputs.

The basic concept of the single-transmit coded excitation comprises modulating a specially designed code sequence based on a transmit burst (base sequence) of length P. A coded pulse sequence of n bursts is often referred to as an n-chip code. The coded pulse sequence, which has a length n×P, enables a larger acoustic dosage or a shorter base sequence to be used to interrogate the flowing blood. The output signal of the decoding (i.e., compression) filter is a compressed signal pulse of length equal, or close to, the original transmit burst length P, but whose amplitude is that produced by the n-times-longer coded pulse sequence. This coding technique has no adverse effects on frame rate and has much less chance of improper decoding due to high velocities or adaptive rotation.

Figure 3:
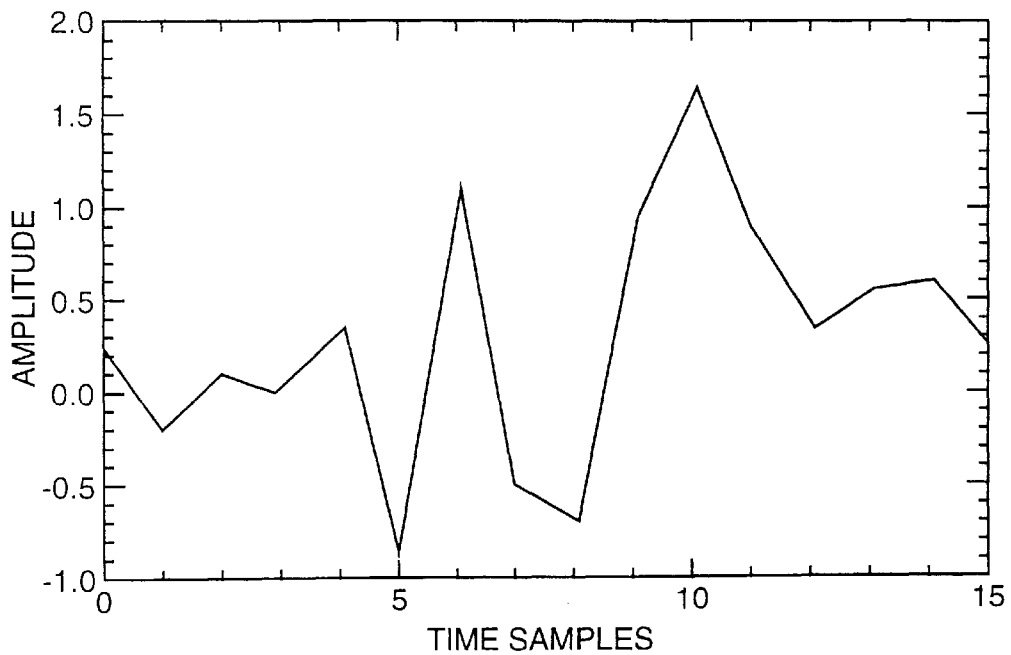
FIG. 3 is a graph showing the filter coefficients of a 16-tap mismatched filter suitable for use with non-Barker single-transmit coded excitation [1,1,1,−1,−1,1,−1,1] in accordance with one example of a preferred embodiment of the invention.
Figure 4:
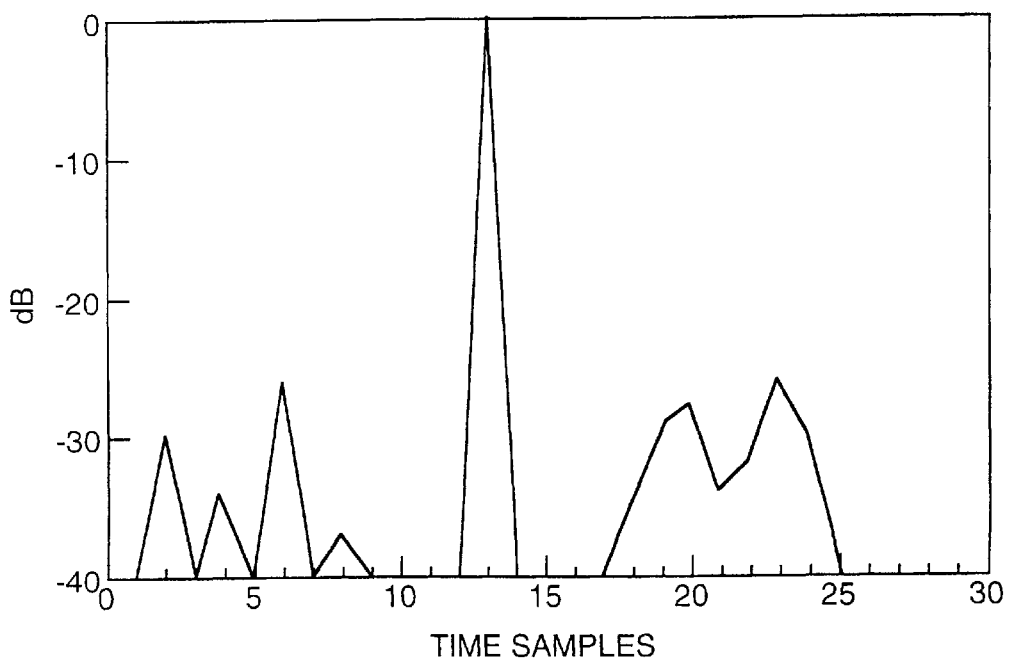
FIG. 4 is a graph showing the decoded signal produced by the 16-tap mismatched filter depicted in FIG. 5 when its filter coefficients are convolved with the code [1,1,1,−1, −1,1,−1,1].

A single coded waveform is transmitted and the received waveform is convolved with the decoding filter impulse response to compress the waveform energy into a small time interval. The decoding filter may be a matched filter (wherein the filter coefficients are the same as the transmit code) or a mismatched filter. The mismatched filter is designed to minimize the sum of squares error between the filter output signal (with the code sequence as input signal) and a Kronecker delta function. Preferred single-transmit codes include Barker codes and non-Barker codes such as the length-8 code [1,1,1,−1,1,−1,−1,1]. When this code is convolved with the length-16 mismatched filter shown in FIG. 3, the output signal is as shown in FIG. 4.

For each transmit, the echo signals from transducer elements 12 are fed to respective receive channels 40 of the receive beamformer. Under the direction of host computer 20 (FIG. 1), the receive beamformer tracks the direction of the transmitted beam. The receive beamformer imparts the proper receive focus time delays 42 to the received echo signal and sums the echo signals to provide a composite echo signal which accurately represents the total ultrasonic energy reflected from a particular position along a transmit beam. The time-delayed receive signals are summed in a receive summer 44 for each of the N transmit firings focused at a particular transmit focal position.

The summed receive signals for successive transmit firings are supplied to a filter 46 which performs the functions of decoding, bandpass filtering and wall filtering. This is accomplished by proper selection of the filter coefficients by the host computer based on system programming and operator inputs. Filter 46 filters across the N transmit firings and supplies a filtered signal to detector 32 which forms the envelope of the firing-to-firing filtered signal. After post-processing (including edge enhancement and logarithmic compression) and scan conversion, a scan line is displayed by display subsystem 22 (FIG. 1). This procedure is repeated so that a respective scan line is displayed for each transmit focal position (in the situation of one transmit focal position for each beam angle) or for each vector (in the situation of multiple transmit focal positions for each beam angle).

In accordance with a preferred embodiment of the invention, filter 46 comprises an FIR filter 48 having an input coupled to the output of receive summer 44; and a vector summer 50 having an input coupled to FIR filter 48 and an output coupled to detector 32. The FIR filter has M filter taps for receipt of a respective set of M filter coefficients for each transmit firing. The filter coefficients for the n-th transmit firing are $a_n c_1, a_n c_2, \ldots, a_n c_M$, where $a_n$ is the scalar weighting for the n-th transmit firing, n=1, 2, . . . , N, and where $c_1, c_2, \ldots, c_M$ is a set of filter coefficients selected so that FIR filter 48 both compresses the receive pulses and passes a major fraction of the desired fundamental frequency band. In particular, filter coefficients $c_1, c_2, \ldots, c_M$ are obtained by convolving a first set of filter coefficients $b_1, b_2, \ldots, b_P$ which are a function of the frequency band to be passed, with a second set of filter coefficients $d_1, d_2, \ldots, d_Q$, which are either matched or mismatched filter coefficients, where M=(P+Q−1). The scalar weightings $a_1, a_2, \ldots, a_N$ form a "wall" filter in slow time which selectively passes signals from reflectors moving at a velocity greater than a predetermined threshold, i.e., the slow-time filter coefficients are chosen to reject low frequencies which correspond to motion at lower speeds. The successive FIR filter output signals for the N transmit firings are coherently accumulated in vector summer 50. This is equivalent to a wall filter with a single output signal sample. The output signal of the vector summer then undergoes envelope detection, post-processing, scan conversion and display in a known manner.

The filter coefficients $a_n c_1, a_n c_2, \ldots, a_n c_M$ are provided to filter 48 for each transmit firing by the host computer from a filter coefficient memory 52. For example, for the first transmit firing, the set of filter coefficients $a_1 c_1, a_1 c_2, \ldots, a_1 c_M$ is supplied to FIR filter 48; for the second transmit firing, the set of filter coefficients $a_2 c_1, a_2 c_2, \ldots, a_2 c_M$ is supplied to the FIR filter; and so forth. The filter coefficients are programmable, depending upon the diagnostic application. Different sets of filter coefficients can be stored in lookup tables in the memory of the host computer and the desired set of coefficients can be selectable by the system operator. For applications where the number of transmit firings N=2, pairs of sets of filter coefficients are stored in memory, one set of filter coefficients of a selected pair being transferred to the FIR filter before the first transmit firing and the other set of filter coefficients of the selected pair being transferred to the FIR filter after the first transmit firing and before the second transmit firing. Similarly, for applications where the number of transmit firings N=3, two or three sets of filter coefficients are stored in memory for use in filtering the receive signals resulting from the first through third firings. A similar procedure is followed for applications where the number of transmit firings N>3.

The time interval between each of the N transmits per focal position is user controllable to determine the "slow-time" filter cutoff frequency. A longer interval between each of the N transmits to a particular focal position results in a lower cutoff frequency with higher sensitivity to low velocity flow.

The flow image may be displayed by itself for maximum flow contrast, or may be summed with a B-mode background image. Superimposition of the flow image on a conventional B-mode image allows the diagnostician to observe the flow of blood relative to known anatomical landmarks during medical diagnosis. The flash artifact seen in this summation of flow and B-mode images is more benign than that found in conventional color-flow imaging.

Figure 5:
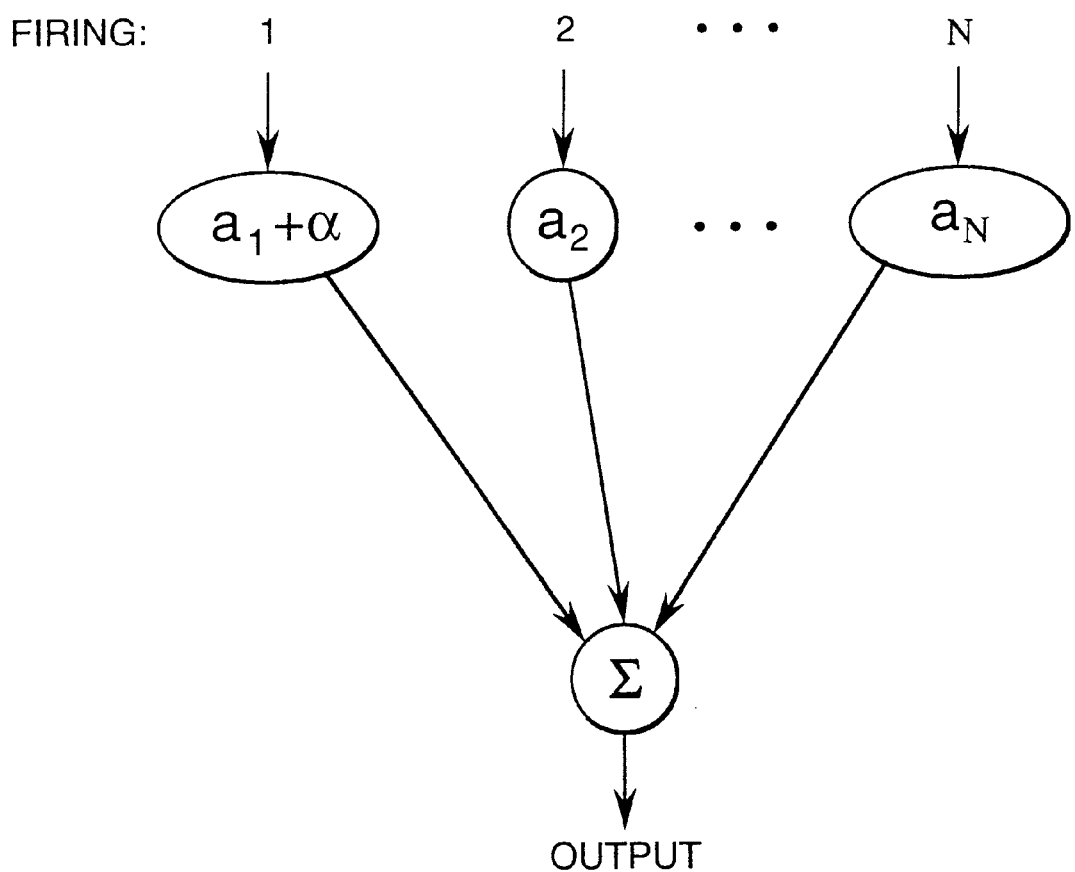
FIG. 5 is a flowchart showing "slow-time" wall filtering with feedthrough of B-mode signal in accordance with the preferred embodiments of the invention.

In one preferred embodiment, a B-mode image derived from the fundamental frequency band is summed with the flow image. This is achieved by perturbing one of the "slow-time" filter weightings so that a fundamental B-mode signal component is passed or fed through the wall filter. For example, the weighting $a_1$, for the first transmit firing (or for any other transmit firing) can be perturbed by an amount α, as shown in FIG. 5. The B-mode feedthrough allows the flow image to be superimposed on a conventional B-mode image for display. Alternatively, the flow image may be superimposed in color on a conventional B-mode image for display. This feedthrough technique is one way of obtaining the B-mode background image without additional firings. Other ways of obtaining a B-mode background image include transmitting pulses specifically for the B-mode image (this method is required for an ROI) and transmitting pulses that are slightly different from each other within a packet such that the wall filter output signal is not zero, even with everything stationary.

In alternative preferred embodiments, the background B-mode image may also be a (sub)harmonic image, which helps to clear up certain image artifacts such as reverberations and out-of-plane acoustic "noise" which may obscure flow imaging. This can be achieved in any one of several ways.

In one preferred embodiment for producing a harmonic B-mode background image, an additional uncoded pulse is transmitted at $f_0$ (usually the transducer lower frequency band edge) with echoes filtered by a bandpass filter (incorporated in FIR filter 48 shown in FIG. 2) centered at frequency $2f_0$ (second harmonic) or frequency $f_0/2$ (subharmonic). This uncoded transmit is followed by at least two coded transmits as previously described. The receive signals for all of these transmits are slow-time filtered by the wall filter. Where one uncoded transmit is followed by two coded transmits, the wall filter scalar weightings $[a_0, a_1, a_2] = [1,1,-1]$. The order in which the coded and uncoded transmits are transmitted can be changed so that the uncoded transmit is in the middle or at the end. Such an arrangement has the effect of passing the harmonic B-mode background image vector through while subtracting one flow image vector from the other.

In another preferred embodiment for producing a harmonic B-mode background image, an even number of uncoded pulses are transmitted in succession, followed by at least two coded pulses. Every other uncoded pulse in the transmit packet may be negated, such that the echoes from the negated uncoded pulses are added to the echoes from the positive uncoded pulses to cancel the fundamental signal and leave the harmonic signal. Subsequently, the harmonic signal is added to the flow signal either before (coherent) or after (incoherent) detection. For example, the transmit packet may consist of two uncoded pulses and at least two coded pulses, the first uncoded pulse having positive polarity and the second uncoded pulse having negative polarity. The receive signals for all of these transmits are then slow-time filtered by the wall filter. Where two uncoded transmits of opposite polarity are followed by two coded transmits, the wall filter scalar weightings $[a_0, a_1, a_2, a_3] = [1, 1, 1, -1]$. The order in which the coded and uncoded transmits are transmitted can be permutated. This arrangement has the effect of passing the harmonic B-mode background image vector through the wall filter while subtracting one flow image vector from the other.

In alternative preferred embodiments of the invention, SNR is recovered using two-transmit coded excitation, e.g., Golay code pairs. In particular, the SNR is improved by transmitting a pair of Golay-encoded base sequences consecutively on each beam at the same focal position and then decoding the beamsummed data. A pair of Golay-encoded base sequences are formed by convolving a base sequence with a Golay code pair after oversampling. A Golay code pair is a pair of binary (+1, −1) sequences with the property that the sum of the autocorrelations of the two sequences is a Kronecker delta function. An oversampled Golay sequence is the Golay sequence with zeroes between each +1 and −1, the number of zeroes being greater than or equal to the length of the base sequence minus one. Golay codes have no range sidelobes. For each firing, decoding is performed using the oversampled Golay sequence corresponding to the Golay-encoded base sequence employed during transmission. By transmitting two sequences of pulses that are polarity-encoded according to a Golay pair, correlation of each of the received beamsum signals with its corresponding oversampled Golay sequence and the summation of those correlations enables an increase in the SNR with virtually no degradation in image resolution or contrast. In practice, range sidelobes do occur due to code distortion, but tend to be below the noise floor and do not adversely affect image quality. Tissue motion that occurs between transmission of the two sequences of the Golay pair also causes code distortion, which increases the range sidelobes. By transmitting the second sequence as soon as the echoes from the first sequence are completely received, the time interval between the two transmits can be minimized. Minimization of the interval between transmits minimizes the motion-induced code distortion.

The ultrasound imaging system shown in FIG. 2 employs complementary code processing. Thus, instead of transmitting a packet consisting of N transmit pulses (e.g., each pulse being a tone burst), a packet is transmitted consisting of 2N transmit pulses, successive transmit pulses being alternatingly encoded with the respective codes of the complementary (e.g., Golay) code pair to form alternating coded pulse sequences A and B. For example, coded pulse sequence A may be formed by coding a sequence of M transmit pulses with a first M-digit transmit code and coding another sequence of M transmit pulses with a second M-digit transmit code, wherein the first and second transmit codes are complementary. Autocorrelation is achieved for each transmit firing by loading the decoding filter with a receive code equal to the transmit code for that firing and filtering the received signals. The autocorrelated sequences are then summed using the wall filter, e.g., with the scalar weightings for every odd-numbered pair of transmits being the negative of the scalar weightings for every even-numbered pair of transmits. In accordance with a preferred embodiment shown in FIG. 6, the transmitter (not shown) in a beamformer 54 fires a packet of complementary-coded pulse sequences A and B in alternating sequence, i.e., A B A B . . . . The receive signals resulting from this packet can be designated as:

$A_1 \ B_1 \ A_2 \ B_2 \ A_3 \ B_3 \ \ldots \ A_N \ B_N$ where $A_i$ is the receive signal for the i-th firing of code A, $B_i$ is the receive signal for the i-th firing of code B, which is the complement of code A, and 2N is the number of firings in a packet. These receive signals are compressed and bandpass filtered by filter 48. In the instance of an RF (radio frequency) beamformer output signal, a demodulator 56 transforms the compressed RF signal into its I and Q components and loads the I and Q components into a corner turner memory 58. A (1,1,−1,−1) wall filter 60 is applied to each down range position across firings, i.e., in "slow time", filtering each range point to produce the respective difference signals:

$(A_1+B_1)-(A_2+B_2)$
$(B_1+A_2)-(B_2+A_3)$
$(A_2+B_2)-(A_3+B_3)$
$(B_2+A_3)-(B_3+A_4)$
. . .
$(A_{N-1}+B_{N-1})-(A_N+B_N)$ (parentheses have been inserted to make the mathematics more obvious). Thus, adjacent complementary code sequences are added together, and the resulting sums are wall-filtered. The wall filter output signal is envelope detected by detector 32, scan converted by scan converter 34, color mapped by a video processor 62 and displayed on a display monitor 64. Wall filter 60 generally allows (N−W+1) signal samples to be produced, where N is the packet size and W is the wall filter length. The wall filter for the implementation shown in FIG. 2 corresponds to N=W. Besides using wideband pulses and small packet sizes, the compression curves and display maps are selected to provide a greater number of effective display bits. The vector density is increased to increase resolution. The flow image is displayed as a color overlay (with selectable color maps loaded into video processor 62) on a B-mode image.

Figure 6:
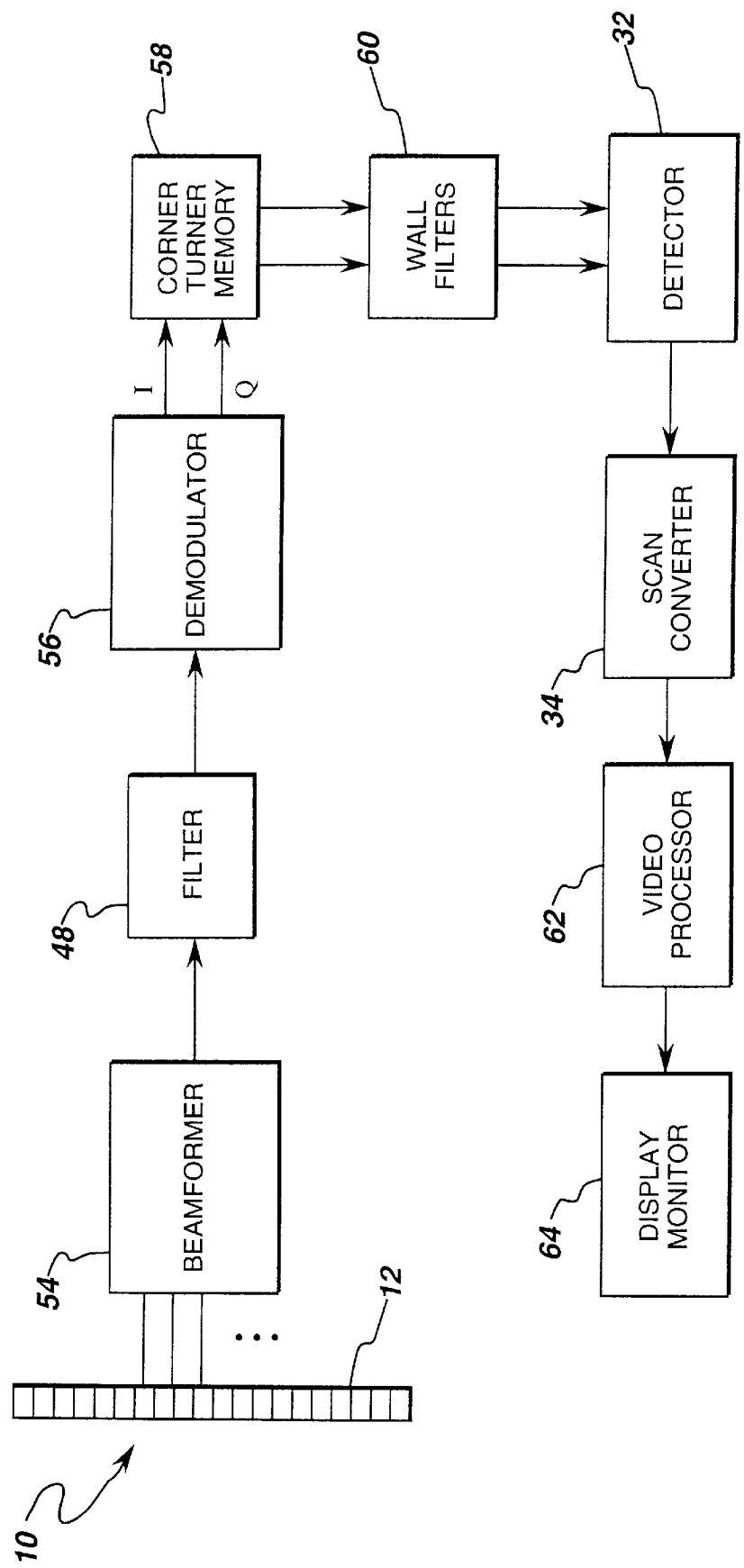
FIG. 6 is a block diagram showing an ultrasound imaging system in accordance with another preferred embodiment of the invention.

In the embodiment of FIG. 6, even though two coded pulse sequences are required for each transmit firing, the staggering of the coded pulse sequences allows the total number of firings in the packet to be increased only by the number of additional wall filter taps for the equivalent number of points supplied to the flow detector, and not by a factor of two. Frame rates can thus be kept sufficiently high by using relatively short wall filters. This implementation also maintains the original velocity dynamic range of ±PRF/2, where PRF is the frequency at which the individual coded pulse sequences A or B are fired, not the frequency at which the pairs of complementary-coded pulse sequences are fired.

When using a single-transmit code, the invention requires at least two transmits of the code, with the resulting echoes being "slow-time" filtered by the wall filter. In contrast, using Golay codes, acquisition of two data points at different times requires four transmits, two for each Golay code of the Golay code pair. Therefore, use of two-transmit codes requires at least four coded transmits. During wall filtering, the same set of scalar weightings are applied to the echoes of both Golay codes of the Golay code pair. Additional uncoded transmits can be included in the packet to acquire a harmonic B-mode background image, as previously described.

In the embodiments based on FIG. 2, the decoding filter, bandpass filter and wall filter are combined in an FIR filter dynamically supplied with appropriate filter coefficients and a vector summer. Alternatively, separate filters could be used. In the embodiment shown in FIG. 6, the decoding filter and bandpass filter are combined in an FIR filter while the wall filter is separate. It should also be appreciated that either of the embodiments depicted in FIGS. 2 and 6 can employed with either single-transmit or multiple-transmit coded excitation.

The frame rate for both the FIGS. 2 and 6 implementations may be increased by using parallel receive hardware to simultaneously process more than one receive vector from a single transmit vector by using parallel receive hardware. The packet size, pulse repetition interval (PRI), and region of interest (ROI) may be controlled by the user. The PRI determines the wall filter cut-off frequency and a larger PRI results in a lower cutoff frequency with higher sensitivity to low velocity flow. When th e b background B-mode image is generated from firings separate from those used to generate the flow image (i.e., not feedthrough), the separate B-mode firings may be interleaved with the flow firings to increase frame rate, and the flow image may be thresholded separately from the B-mode image.

In a preferred embodiment, the scan direction of the ultrasound beam is opposite that of the blood flow direction, thereby providing greater apparent flow sensitivity (more uniform fill-out to vessel edge) and greater resolution (smaller scatterer sizes). The scan direction is changed by user control either electronically or by manually turning the probe around.

One way to significantly increase the flow contrast (i.e., visibility from background) is to use contrast agents in the fundamental mode. Contrast agents are typically encapsulated gas microbubbles between 0.1 and 10 microns in diameter. When introduced into the body through injection, contrast agents serve as high-reflectivity markers for blood flow and perfusion. Ultrasound energy incident on the microbubbles is strongly reflected at the incident (fundamental) frequencies and at resonant (harmonic and subharmonic) frequencies, such that both fundamental and harmonic imaging techniques are used to image contrast agent. The preferred method uses the fundamental and not harmonic frequencies within the contrast echoes. Multiple firings of identical pulses are transmitted to a particular transmit focal position in succession. Specifically, N coded pulses centered at a fundamental frequency $f_0$ are transmitted to each transmit focal position. On receive, an FIR filter centered at the fundamental frequency compresses the received pulses and substantially isolates the desired fundamental component. Subsequently a wall filter extracts the fundamental flow signal over the N transmits. This process is repeated for a multiplicity of transmit focal positions in a scan plane and is repeated for each of a multiplicity of scan planes. Each scan plane is acquired in succession as the ultrasound probe is swept over, i.e., moved (by hand or by a probe positioning device) relative to, the body (object volume) being scanned. The data from each scan plane are processed to produce a display image frame.

Figure 7:
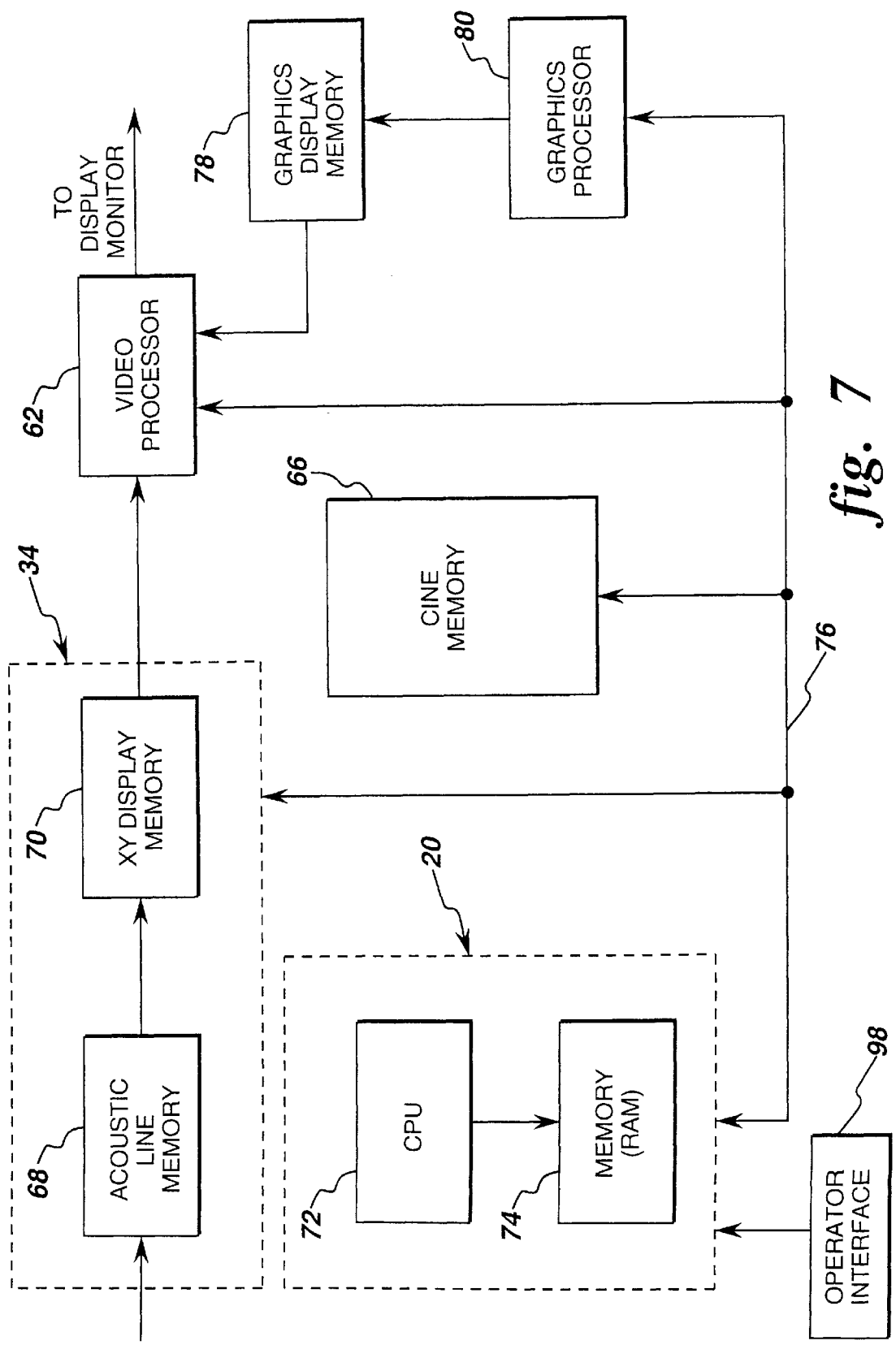
FIG. 7 is a block diagram showing means for reconstructing frames comprising successive volumetric projections of pixel intensity data in accordance with a preferred embodiment of the invention.

As shown in FIG. 7, system control is centered in host computer 20, which accepts operator inputs through an operator interface 90 (e.g., keyboard and trackball) and in turn controls the various subsystems. Scan converter 34 comprises an acoustic line memory 68 and an XY display memory 70. The B-mode flow imaging data stored in polar coordinate (R-θ) sector format in acoustic line memory 68 is transformed to appropriately scaled Cartesian coordinate intensity data, which are stored in XY display memory 70. Each image frame out of XY display memory 70 is sent to video processor 62. Before gray mapping, frames of B-mode flow imaging data in the video processor 62 are stored in a cine memory 66 on a first-in, first-out basis. Storage can be continuous or as a result of an external trigger event. Cine memory 66 is effectively a circular image buffer that runs in the background, capturing image data that are displayed in real time to the user. By freezing the system (through operation of an appropriate device on operator interface 90), the user has the capability to view image data previously captured in cine memory.

During imaging, a long sequence of the most recent images are stored and continuously updated in cine memory 66. Some systems are designed to save the R-θ acoustic images, while other systems store the X-Y video images. The image loop stored in cine memory 66 can be reviewed on the display monitor via trackball control (interface 90), and a section of the image loop can be selected for hard disk storage.

The selected image sequence stored in cine memory 66 is transferred to host computer 20 for three-dimensional reconstruction. The multiple frames of flow imaging data acquired during the sweep of the probe form a three-dimensional data volume. Host computer 20 retrieves the data volume from cine memory 66 and uses any one of various volume rendering techniques (e.g., maximum or average pixel projection, composite, or surface) to reconstruct projected images onto various imaging planes. The projected data resulting from each projection are written back into another portion of the cine memory or into the scan converter memory, from where they are sent to display monitor 64 via video processor 62.

Host computer 20 comprises a central processing unit (CPU) 72 and a random access memory 74. CPU 72 has memory for storing routines used in transforming an acquired volume of flow imaging data into a multiplicity of three-dimensional projection images taken at different angles. CPU 72 controls the flow of data between X-Y display memory 70, video processor 62, cine memory 66 and the CPU itself via a system control bus 76. Each frame of imaging data, representing one of a multiplicity of scans or slices through the object being examined, is stored sequentially in acoustic line memory 68, the X-Y display memory 70 and video processor 62. Before gray mapping, frames of B-mode flow imaging data are sent from the video processor to cine memory 66. A stack of frames, representing the scanned object volume, is stored in cine memory 66, forming a source data volume. After the source data volume has been acquired, CPU 72 can provide three-dimensional projections of the data as well as arbitrary slices through the source data volume.

The conventional system has capability to superimpose graphical symbols on any ultrasound image. The superimposition of graphics on the image frame is accomplished in video processor 62, which receives the ultrasound image frame from X-Y display memory 70 and the graphics data from a graphics display memory 78. The graphics data are processed and supplied to graphics display memory 78 by a graphics processor 80, which is synchronized with the other subsystems by host computer 20.

In order to generate three-dimensional images, CPU 72 can transform a source data volume retrieved from cine memory 66 into an imaging plane data set. The successive transformations may involve a variety of projection techniques such as maximum, minimum, composite, surface or averaged projections made at angular increments, e.g., at 10° intervals, within a range of angles, e.g., +90° to −90°. Each pixel in the projected image includes the transformed data derived by projection onto a given image plane.

In free-hand three-dimensional ultrasound scans, a transducer array (1D to 1.5D) is translated in the elevation direction to acquire a substantially parallel set of image planes through the anatomy of interest. These images can be stored in the cine memory and later retrieved by the system computer for three-dimensional reconstruction. If the spacings between image frames are known, then the three-dimensional volume can be reconstructed with the correct aspect ratio between the out-of-plane and scan plane dimensions. If, however, the estimates of the inter-slice spacing are poor, significant geometric distortion of the three-dimensional object can result.

The ultrasound scanner collects B-mode flow imaging data in the cine memory on a continuous basis. As the probe is swept over an area of the anatomy, using either a free-hand scanning technique or a mechanical probe mover, a three-dimensional data volume is stored in cine memory. The distance traveled by the probe may be determined by any of a number of techniques. The user can provide an estimate of the distance swept. If the probe is moved at a constant rate by a mechanical probe mover, the distance can easily be determined. Alternatively, a position sensor can be attached to the probe to determine the position of each slice. Markers on the anatomy or within the data can also provide the required position information. Yet another way is to estimate the scan plane displacements directly from the degree of speckle decorrelation between successive image frames.

Figure 8:
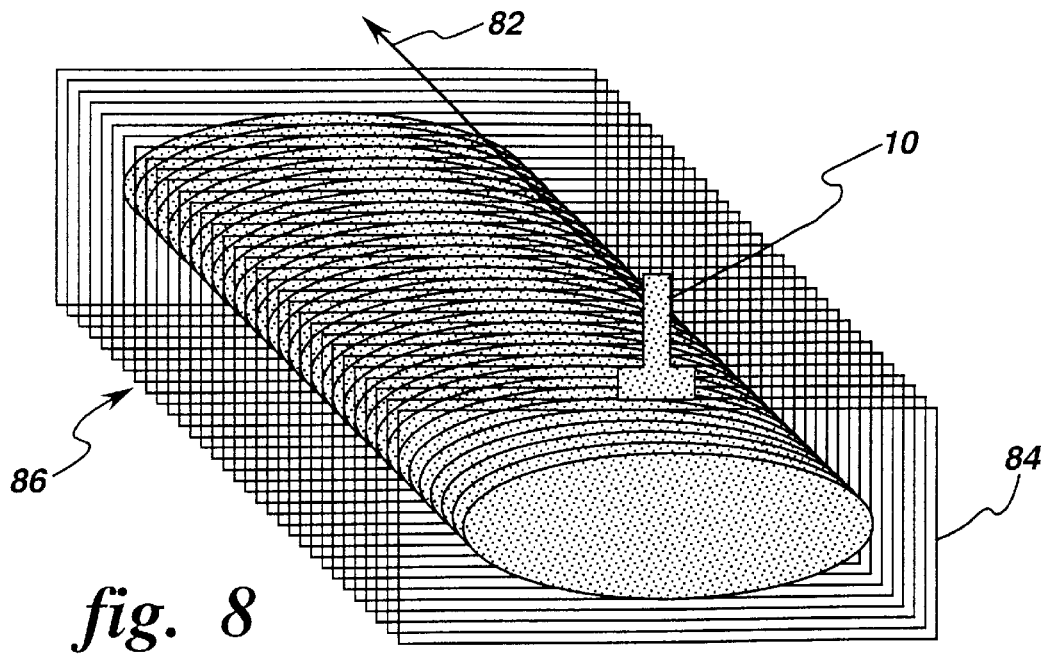
FIG. 8 is a diagram depicting a volume of data acquired by linearly scanning an ultrasound probe in a direction perpendicular to the scan plane of the probe.
Figure 9:
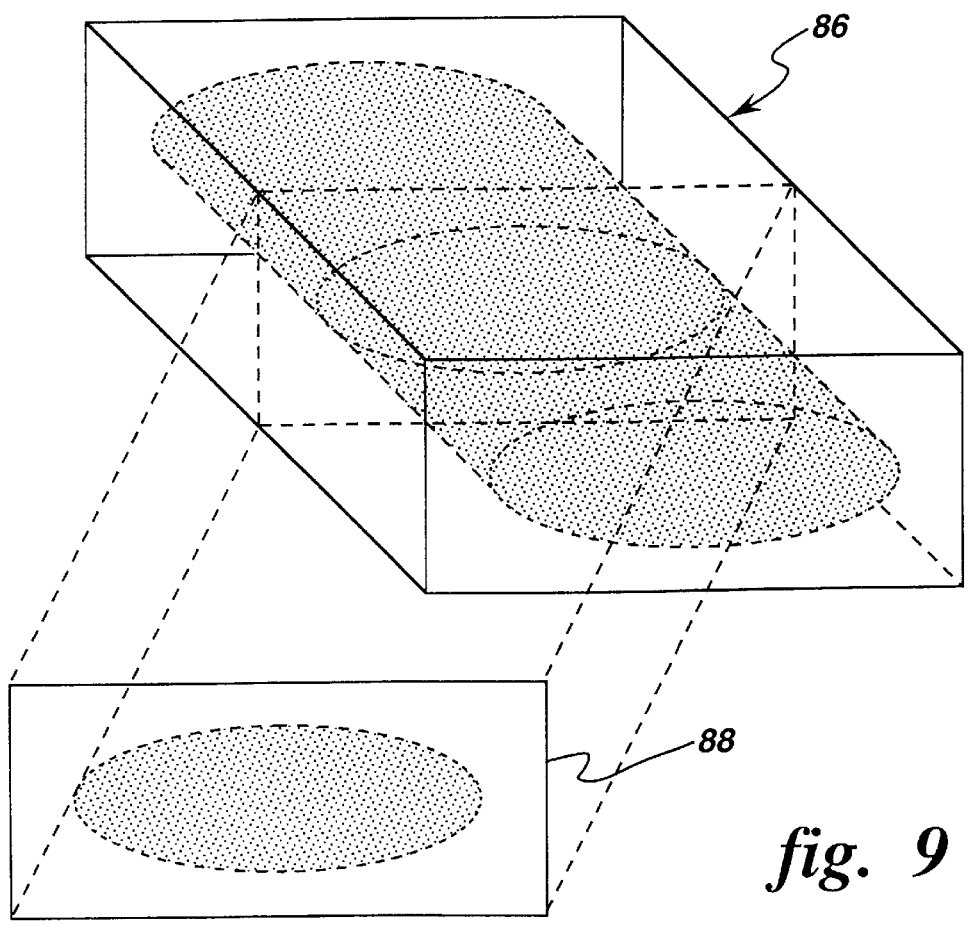
FIG. 9 is a diagram depicting an individual slice at an arbitrary angle obtained by reformatting the data volume depicted in FIG. 8.

Referring to FIG. 8, if ultrasound probe 10 is swept (arrow 82 indicates a linear sweep) over an area of a body (either manually or by a mechanical probe mover), such that the inter-slice spacing is known, and slices 84 are stored in memory, a three-dimensional data volume 86 can be acquired. The data volume can be processed (e.g., using projection onto an imaging plane) to form a three-dimensional view of the area of interest. In addition, the data can be reformatted to produce an individual slice 88 (FIG. 9) at an arbitrary angle, thus allowing the user to get the exact view desired regardless of the anatomy under investigation. Algorithms for producing three-dimensional projections of two-dimensional data are well known, as are techniques for reformatting data to produce arbitrary slices through a data set. A problem that arises, however, is how to display the information such that it is easy for the observer to relate the two-dimensional slice to the three-dimensional anatomy.

Figure 10A:
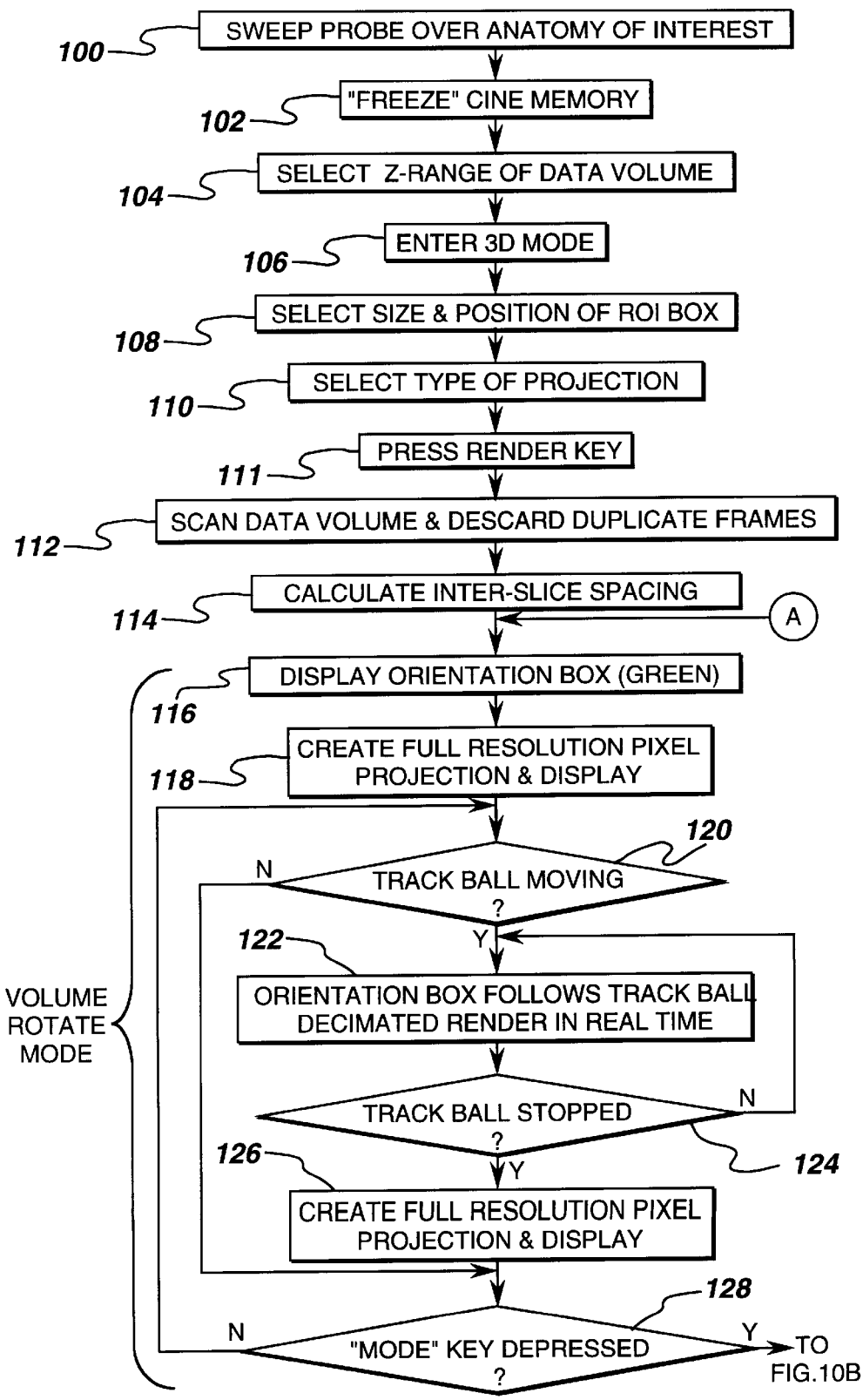
FIG. 10 is a flowchart showing a procedure for acquiring and displaying flow imaging data.
Figure 10B:
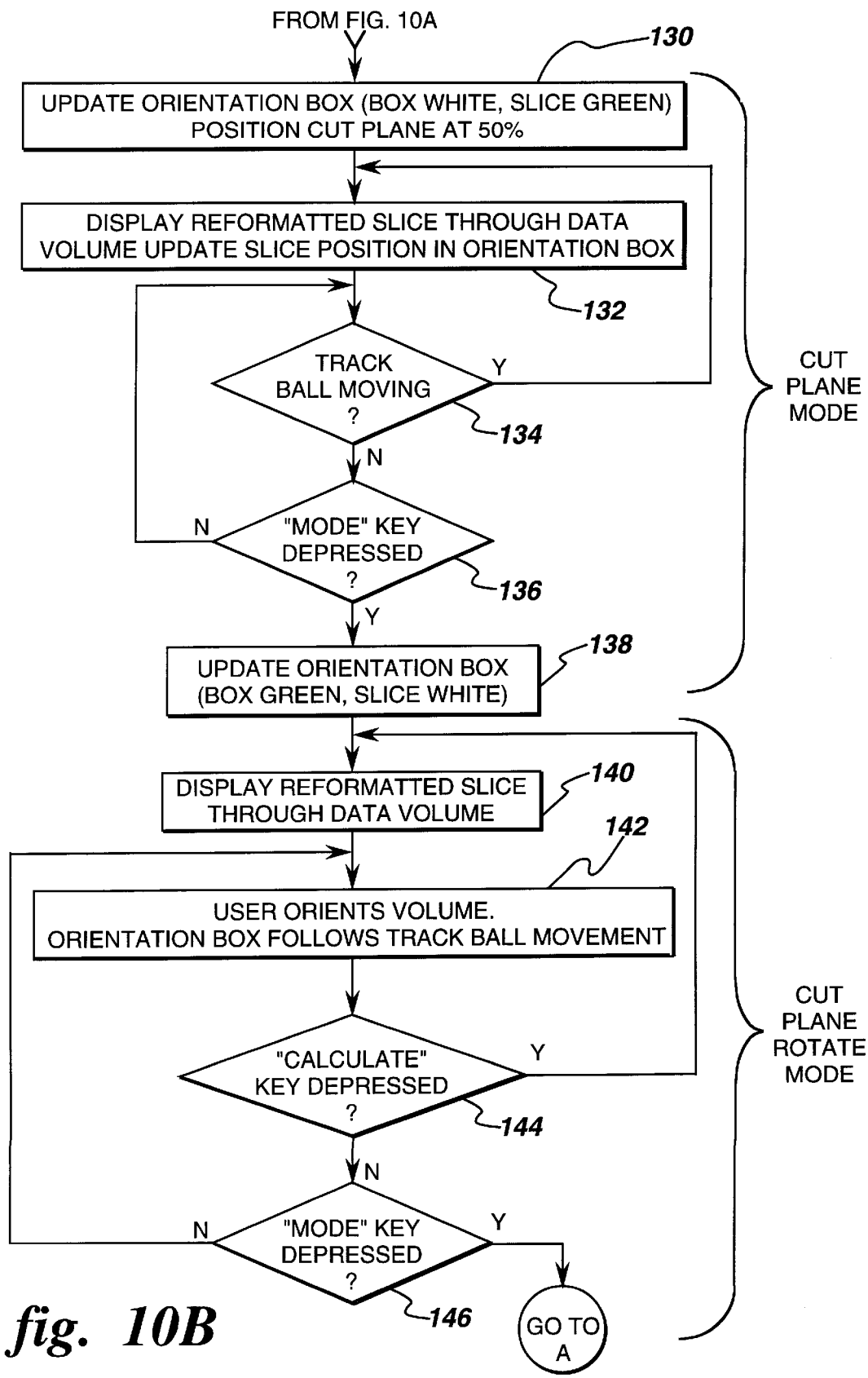
Figure 11:
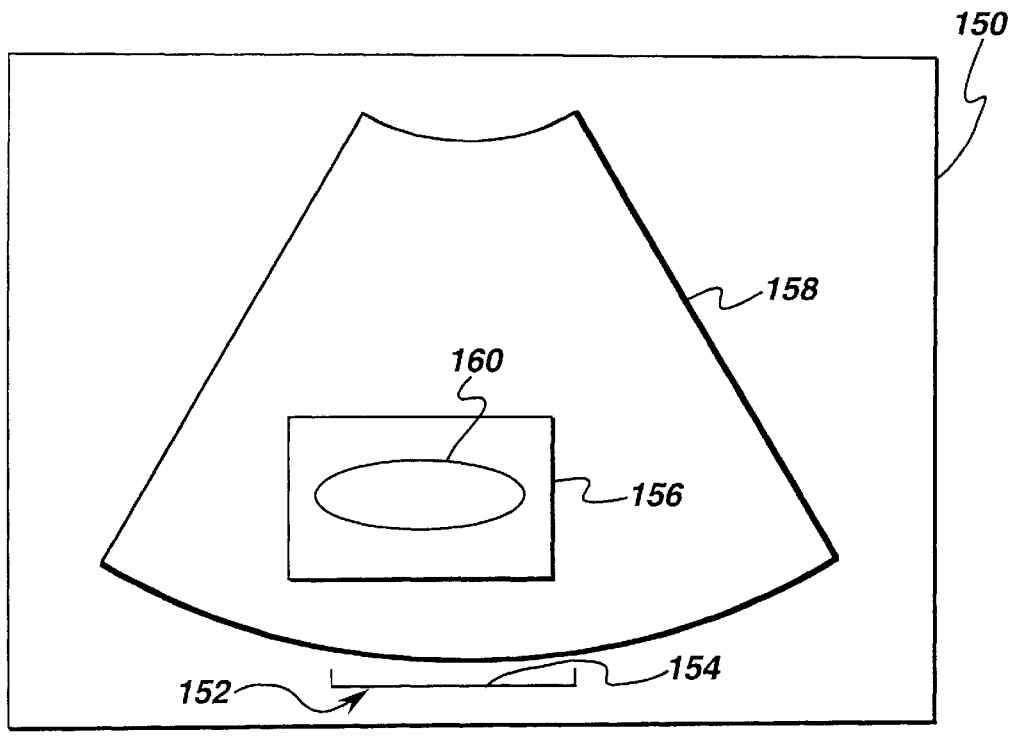
FIG. 11 is a diagram depicting a display of a sector scan ultrasound image, with graphics indicating a user-defined volume of interest.

FIG. 10 is a flowchart of the acquisition and display procedure. The user begins by sweeping the ultrasound probe over an area of interest (step 100). For example, the data may be acquired by a free-hand sweep in a linear or rocking motion. After the data are acquired, the user "freezes" the cine memory (step 102) by depressing a FREEZE key on operator interface 90 (FIG. 7) and then selects the range of cine memory frames (slices) to be included in the Z-dimension of the data volume (step 104) by moving a trackball. As seen in FIG. 11, a Z-dimension select gauge 152 appears on display screen 150 when the trackball is moved. The trackball is used to control the position of an indicator 154 relative to gauge 152. The indicator can be moved to a desired left end point and the left end point can then be locked by depressing a predetermined key on the operator interface. The indicator can then be moved to a desired right end point and the right end point can be locked by depressing the same predetermined key. This establishes the slices to be included in the data volume. The operator then enters the "3D mode" by depressing the appropriate key on the interface (step 106). Upon entering the 3D mode, the operator must first select the XY-dimension and location of the ROI within the data volume (step 108). This step is accomplished by manipulating a region of interest box 156 (shown in FIG. 11) which appears in a default position on display screen 150 in response to depression of the 3-D mode key. The region of interest box 156 can be sized and translated in the X and Y directions to encompass an imaged structure 160 which appears on the sector scan image 158. Region of interest box 156 is translated by moving the trackball and is sized by operation of a four-sided rocker switch incorporated in operator interface 90 (FIG. 7). The rocker switch is programmed, for example, so that the region of interest increases in size in the Y dimension when the switch is moved downward; decreases in size in the Y dimension when the switch is moved upward; increases in size in the X dimension when the switch is moved rightward; and decreases in size in the X dimension when the switch is moved leftward.

After the ROI has been defined, the operator selects (step 110 of FIG. 10) the type of three-dimensional projection (minimum, maximum or average pixel projection, surface, composite, etc.) and the display mode desired, and presses a render key (step 111) on the operator interface. The defined ROI is then retrieved from cine memory 66 (FIG. 7) by host computer 20. The host computer scans the retrieved data for duplicate frames and discards them (step 112). The host computer then calculates the inter-slice spacing for the data set (step 114). (The inter-slice spacing is assumed to be constant over the length of the data volume.) For example, the inter-slice spacing can be calculated using the adaptive speckle correlation technique disclosed in L. Mo et al. U.S. patent application Ser. No. 09/045,780 filed Mar. 20,1998 and assigned to the instant assignee.

After the inter-slice spacing has been calculated, the system enters a "volume rotate" mode, which is one of three submodes included in the 3D mode. Referring to FIG. 7, in the "volume rotate" mode, signals representing a colored (e.g., green) orientation box are generated by graphics processor 80, arranged in XY format in graphics display memory 78, and sent to video processor 62. The video processor causes a green orientation box to be displayed on the display monitor (step 116). At the same time the host computer performs the selected full-resolution pixel projection of the defined data volume based on the calculated inter-slice spacing (step 118). The projected three-dimensional image is sent to XY display memory 70 and then on to video processor 62. The projected three-dimensional image is also captured by cine memory 66. Video processor 62 causes the projected three-dimensional image to be displayed on the display screen along with the orientation box. Both the orientation box and the initial projection are oriented with the Z axis pointing into the screen, the Y axis vertical, and the X axis horizontal, i.e., the orientation box appears as a rectangle having X and Y dimensions proportional to the X and Y dimensions of the selected region of interest. The data slices are acquired along the Z axis. This is defined as the zero angle projection.

In the "volume rotate" mode, the operator can use the trackball to rotate the orientation box and the projected image about the X and Y axes. Rotation about the Z axis is performed using a separate rotary knob on the operator interface. The orientation box and the projected image follow the movement of the trackball and rotary knob in "real-time" so that the user can orient the box as desired. The rotational position of each axis is shown on the display screen. To realize real-time rotation of the projected image, the system detects whether the trackball is moving (step 120). If the trackball is moving, the orientation box follows the trackball and a decimated rendering is performed in real-time (step 122). If the trackball is stopped (step 124), a full-resolution pixel projection is again created and displayed.

Figure 12:
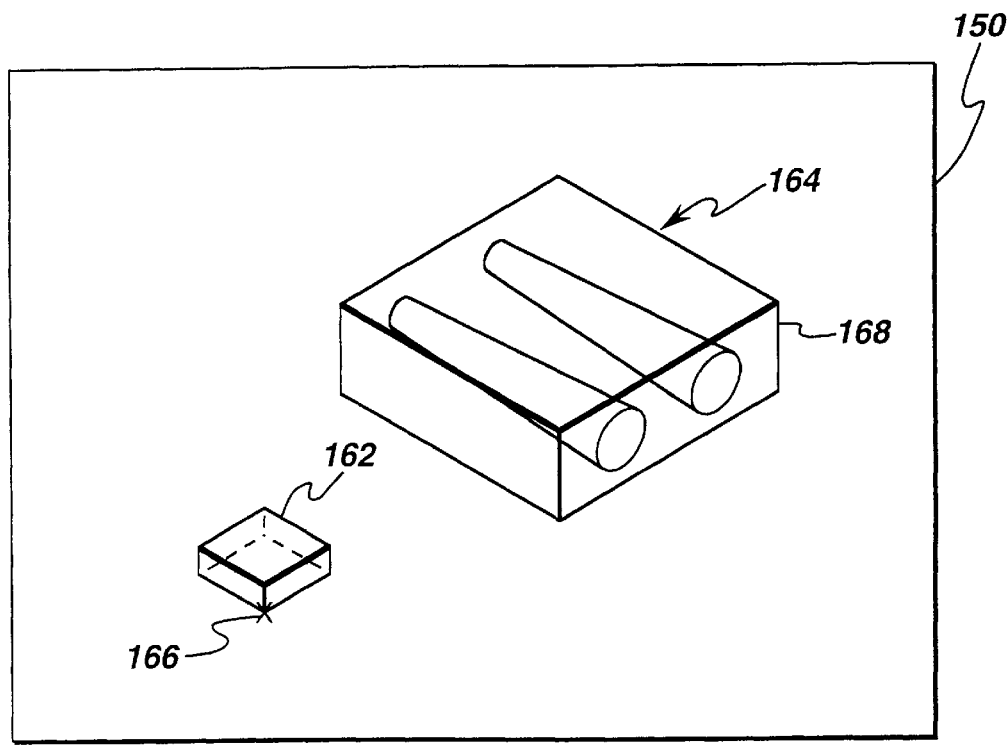
FIG. 12 is a diagram depicting a display of a projected ultrasound image made at an arbitrary angle, with graphics indicating the orientation of the data volume.

FIG. 12 shows an exemplary projection 164 at an arbitrary angle indicated by an orientation box 162. The orientation box has a marker 166 in the lower front left corner while the back corners of the box are dashed to aid the user in distinguishing the front and back of the box. As an aid to visualization, a box 168 is overlaid on projection 164 which matches orientation box 162 and is depth shaded to appear to become darker as the box goes towards the "back" of the data volume. The user may reposition orientation box 162 with the trackball and rotary knobs and re-project as many times as desired. In addition, rotations of plus or minus 90° may be made with special keys on the operator interface.

The rendering of a volume of flow imaging data is accomplished utilizing an object-order volume visualization technique where each voxel is mapped from the data space to the image space according to a projection matrix. The goal of this rendering method is to efficiently generate two-dimensional images from the three-dimensional data while minimizing artifacts.

The data volume consists of $N_x$ by $N_y$ by $N_z$ data samples, known as voxels, along the X, Y, and Z axes respectively. In the data coordinate system, voxels are assumed to be uniformly spaced one unit apart along each axis, with the origin at the center of the data volume. Since voxels in the actual data volume may not be uniformly spaced, a scaling matrix $[S_A]$ is used to account for the aspect ratio of data samples. The data samples may then be rotated by the desired angles about the X, Y, and Z axes, and projected onto the image plane using an orthographic transformation. This process can be written as:

$$[x_d, x_d, x_d][S_A][R] = [x_i, y_i, z_i]$$

where $[x_d, y_d, z_d]$ are the coordinates of a voxel in data space, $[R]$ is the desired rotation matrix and $[x_i, y_i, z_i]$ represent the image space pixel. The projection transformation $[S_A][R]$ maps $Z^3$ to $R^3$ (where the coordinates in R space are real numbers and the coordinates in Z space are integers). The z component is discarded and a floor operation (i.e., truncating the real numbers to integers) is applied to convert $R^2$ to $Z^2$. As this projection transformation is performed, the voxel data are processed in accordance with the selected projection technique. For example, if a maximum pixel projection technique is used, each image space pixel will store only the maximum of the set of voxel data mapped to that image space pixel by the above-described projection transformation. This process is illustrated in FIG. 13, which shows the voxel data 170 initially, the voxel data 172 after being multiplied by aspect scaling the voxel data 174 after being rotated by the desired angle, and the voxel data 176 projected onto the image plane.

Figure 13:
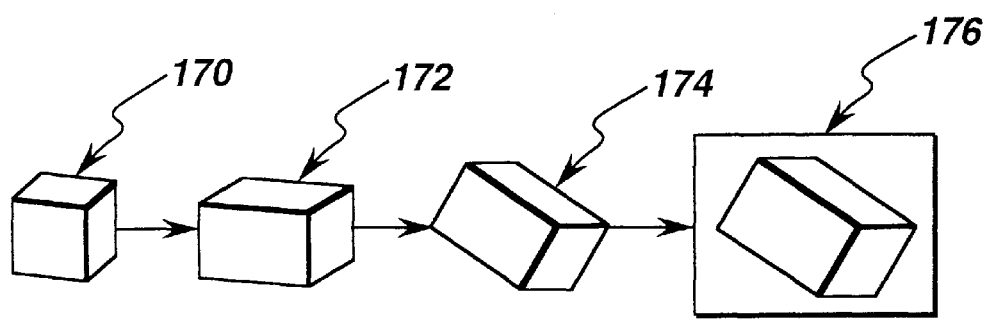
FIG. 13 is a diagram depicting a projection transform procedure which is advantageously used in a preferred embodiment of the invention.

Using the process illustrated in FIG. 13, adjacent data samples do not necessarily project to adjacent pixels on the image plane, leading to blank spots or "holes" in the projected images. To eliminate these holes, two additional scaling steps are introduced into the projection, yielding:

$$[x_d, y_d, z_d][S_A][R][S_H][S_H^{-1}] = [x_i, y_i, z_i]$$

This projection process is then decomposed into two steps:

$$[x_d, y_d, z_d][S_A][R][S_H] = [x_t, y_t, z_t]$$

$$[x_t', y_t'][S_H^{-1}] = [x_i, y_i]$$

In the first step, the data coordinate $[x_d, y_d, z_d]$ in $Z^3$ is mapped to the intermediate coordinate $[x_t, y_t, z_t]$ in $R^3$. The z component is discarded and a floor operation is used to obtain $[x_t', y_t']$ in $Z^2$. In the second step, the inverse scaling operation is performed in two-dimensional image space.

In order to eliminate holes from the image, the scaling matrix $[S_H]$ ensures that neighboring data samples (those that are, at most, one sample apart along the X, Y and Z axes in the data space) map to neighboring pixels. Two factors contribute to holes in the image: a first is attributable to the scaling of the sample points to account for the aspect ratio and the second is due to the rotation of the data samples. The scaling matrix $[S_H]$ eliminates the holes by scaling along the X and Y axes of the image.

The scaling factors to account for the aspect ratio are computed using the equations:

$$X_{as} = 1.0/\|[1,0,0][R^{-1}][S_A^{-1}]\|$$

$$Y_{as} = 1.0/\|[0,1,0][R^{-1}][S_A^{-1}]\|$$

$$Z_{as} = 1.0.$$

These scaling factors are used to define an intermediate scaling matrix $[S_H']$ from which is computed the rotation scaling factors.

The scaling factors to correct for rotation are determined by projecting each of the four diagonal vectors in a cube, $V = \{[1,1,1], [-1,1,1], [-1,1,-1], [1,1,-1]\}$, onto the image plane and computing the maximum separation distance along the X and Y dimensions independently:

$$X_{rs} = 1.0/(MAX\{\|[1,0,0] \cdot [[V_i][S_A][R][S_H']]\|\} \forall V_i \epsilon V)$$

$$Y_{rs} = 1.0/(MAX\{\|[0,1,0] \cdot [[V_i][S_A][R][S_H']]\|\} \forall V_i \epsilon V)$$

The final scaling factors used to compute $[S_H]$ are the products of the aspect and rotation scaling factors:

$$X_s = X_{as}X_{rs}, Y_s = Y_{as}Y_{rs}, Z_s = 1.0$$

These combined scaling factors are used to ensure that voxels which are one unit apart along the X, Y and Z axes in data space are mapped onto pixels that are at most one unit apart along the X and Y axes on the image plane.

Figure 14:
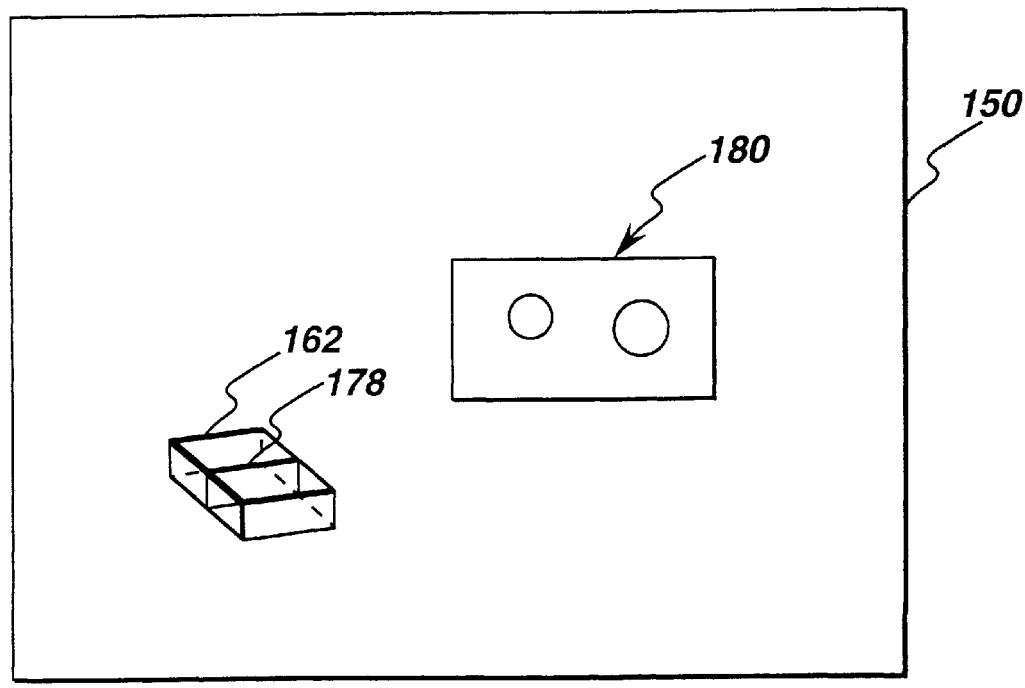
FIG. 14 is a diagram depicting a display of a two-dimensional slice with graphics representing the position and orientation of the slice relative to the data volume.

The ultrasound imaging system operator can view two-dimensional slices through the data volume at the existing X, Y, Z rotation orientation by pressing a "display mode" key (step 128 in FIG. 10) to change from the "volume rotate" mode to the "cut-plane" (reformat) mode. Referring to FIG. 14, orientation box 162 changes color (e.g., from green to white) and a colored (e.g., green) polygon 178 appears within the orientation box (step 130) at the center of the data volume. The green color signifies that this portion within the box can be moved. The system then produces an initial representation 180 of a two-dimensional slice through the center of the data set at the existing orientation (step 132).

The shape of slice 180 matches the shape of polygon 178 in orientation box 162. The operator may then use the trackball to scroll through the data set. If the system detects that the trackball is moving (step 134), successive two-dimensional slices of the data set are displayed at the selected orientation and position in real-time. If the trackball is not moving (step 134) and the "display mode" key is depressed (step 136), the system exits the "cut plane" mode and enters the "cut plane rotate" mode.

In the "cut plane rotate" mode, the green polygon in the orientation box is moved (step 138) to visually indicate the location of the slice within the data volume, and a display panel is updated to show the location of the slice as a percentage of the total volume (i.e., 50% would be the center of the data volume). The green polygon that indicates the location of the slice through the data volume turns white, and the orientation box turns green, indicating that the slice is now fixed and the data volume may rotate relative to the slice. The system then displays the reformatted slice in the manner previously described (step 140). The user may now orient the data volume to a new X, Y, Z orientation by moving the trackball (step 142) and, in doing so, the orientation box follows the trackball movement and the white polygon changes shape to show the shape of the slice. When the orientation is set, the user depresses a "calculate" key (step 144), which causes the system to display a new two-dimensional slice taken at the angle indicated by the angle of the polygon relative to the orientation box. If the "display mode" key is not depressed (step 146), the operator can reorient the data volume. If the "display mode" key is depressed, the system returns to the "volume rotate" mode.

Algorithms for producing three-dimensional projections of two-dimensional data are well known, as are techniques for reformatting data to produce arbitrary slices through a data set. As indicated in FIG. 7, the projected or reformatted data are supplied by host computer 20 to XY display memory 70. The image frame of projected or reformatted data is then sent to video processor 62 and captured by cine memory 66. The video processor superimposes the orientation box and other graphical symbols onto the image frame of projected reformatted data for output to the display monitor.

The B-mode feed-through parameter may be adjusted to allow the user to see varying amounts of the normal B-mode background image relative to the flow imaged in the two-dimensional and three-dimensional projections. Contrast agents can be injected into the body of the subject to enhance the flow information in the display image.

While only certain preferred features of the invention have been illustrated and described, many modifications and changes will occur to those skilled in the art. For instance, the invention is not limited to using biphase codes; polyphase codes can also be used. It is, therefore, to be understood that the appended claims are intended to cover all such modifications and changes as fall within the true spirit of the invention.

What is claimed is:

1. An imaging system comprising:

a transducer array having a multiplicity of transducer elements for transmitting wave energy centered at a fundamental frequency in response to electrical activation and for transducing returned wave energy into electrical signals;

a transmitter coupled to said transducer array and programmed to activate a plurality of said transducer elements to transmit focused wave energy encoded with a transmit code during first and second transmit events for each of a multiplicity of transmit focal positions in each of a multiplicity of scan planes;

a receiver programmed to respectively form first and second receive signals from electrical signals produced by said plurality of transducer elements subsequent to said first and second transmit events respectively for each of a multiplicity of scan lines in each of said scan planes;

a wall filter programmed with first and second sets of filter coefficients to compress and bandpass first and second fundamental signal components of said first and second receive signals respectively and selectively pass frequencies corresponding to wave energy reflectors moving at a velocity above a predetermined threshold, said wall filter forming a respective flow signal derived at least in part from the compressed and bandpassed first and second fundamental signal components and the selectively passed frequencies for each of said scan lines in each of said scan planes;

a memory for storing a respective set of flow signals for each of said scan planes to form a data volume;

a computer programmed to generate imaging data representing a three-dimensional projection of said data volume having a controllable orientation onto an imaging plane by applying a projection transformation to said data volume; and a subsystem for displaying an image which is a function of said three-dimensional projection.

2. The system as recited in claim 1, wherein said second set of filter coefficients are the negative of said first set of filter coefficients.

3. The system as recited in claim 1, wherein all but at least one of said second set of filter coefficients are the negative of said first set of filter coefficients, said at least one of said filter coefficients being perturbed to allow B-mode fundamental signal feedthrough.

4. The system as recited in claim 1, wherein said transmitter is further programmed to activate a plurality of said transducer elements to transmit focused wave energy which is uncoded during a third transmit event for each transmit focal position, said receiver is further programmed to form a third receive signal from electrical signals produced by said plurality of transducer elements subsequent to said third transmit event for each of said scan lines, and said wall filter is further programmed with a third set of filter coefficients to bandpass a harmonic signal component of said third receive signal for summing with said compressed and bandpassed first and second fundamental signal components and the selectively passed frequencies for each of the scan lines in each of said scan planes.

5. The system as recited in claim 1, wherein said transmitter is further programmed to activate a plurality of said transducer elements to transmit focused wave energy which is uncoded during third and fourth transmit events for each transmit focal position, said uncoded focused wave energy of said third transmit event being of opposite polarity to said uncoded focused wave energy of said fourth transmit event, said receiver is further programmed to form third and fourth receive signals from electrical signals produced by said plurality of transducer elements subsequent to said third and fourth transmit events respectively for each of said scan lines, and said wall filter is further programmed with third and fourth sets of filter coefficients to bandpass respective harmonic signal components of said third and fourth receive signals for summing with said compressed and bandpassed first and second fundamental signal components and the selectively passed frequencies for each of the scan lines in each of said scan planes while substantially canceling respective fundamental signal components of said third and fourth receive signals.

6. The system as recited in claim 1, wherein said transducer elements comprise piezoelectric elements for transmitting ultrasound waves in response to electrical activation and for transducing returned ultrasound waves into electrical signals.

7. An imaging system comprising:
  a transducer array having a multiplicity of transducer elements for transmitting wave energy centered at a fundamental frequency in response to electrical activation and for transducing returned wave energy into electrical signals;
  a transmitter coupled to said transducer array and programmed to activate a plurality of said transducer elements to transmit focused wave energy encoded with a first Golay code of a Golay code pair during first and third transmit events and transmit focused wave energy encoded with a second Golay code of said Golay code pair during second and fourth transmit events for each of a multiplicity of transmit focal positions in each of a multiplicity of scan planes;
  a receiver programmed to respectively form first through fourth receive signals from electrical signals produced by said plurality of transducer elements subsequent to said first through fourth transmit events respectively for each of a multiplicity of scan lines in each of said scan planes;
  a wall filter programmed with first through fourth sets of filter coefficients to decode and bandpass first through fourth fundamental signal components of said first through fourth receive signals respectively and selectively pass frequencies corresponding to wave energy reflectors moving at a velocity above a predetermined threshold, said wall filter forming a flow signal derived at least in part from said decoded and bandpassed first through fourth fundamental signal components and the selectively passed frequencies for each of said scan lines in each of said scan planes;
  a memory for storing a respective set of flow signals for each of said scan planes to form a data volume;
  a computer programmed to generate imaging data representing a three-dimensional projection of said data volume having a controllable orientation onto an imaging plane by applying a projection transformation to said data volume; and
  a subsystem for displaying an image which is a function of said three-dimensional projection.

8. The system as recited in claim 7, wherein said third set of filter coefficients are the negative of said first set of filter coefficients, and said fourth set of filter coefficients are the negative of said second set of filter coefficients.

9. The system as recited in claim 7, wherein said third set of filter coefficients are the negative of said first set of filter coefficients, and said fourth set of filter coefficients are the negative of said second set of filter coefficients, with at least one pair of said filter coefficients being perturbed to allow B-mode fundamental signal feedthrough.

10. The system as recited in claim 7, wherein said transmitter is further programmed to activate a plurality of said transducer elements to transmit focused wave energy which is uncoded during a fifth transmit event for each of said transmit focal positions, said receiver is further programmed to form a fifth receive signal from electrical signals produced by said plurality of transducer elements subsequent to said fifth transmit event for each of said scan lines, and said wall filter is further programmed with a fifth set of filter coefficients to bandpass a harmonic signal component of said fifth receive signal for summing with said compressed and bandpassed first through fourth fundamental signal components and the selectively passed frequencies for each of said scan lines in each of said scan planes.

11. The system as recited in claim 7, wherein said transmitter is further programmed to activate a plurality of said transducer elements to transmit focused wave energy which is uncoded during fifth and sixth transmit events for each of said transmit focal positions, said uncoded focused wave energy of said fifth transmit event being of opposite polarity to said uncoded focused wave energy of said sixth transmit event, said receiver is further programmed to form fifth and sixth receive signals from electrical signals produced by said plurality of transducer elements subsequent to said fifth and sixth transmit events respectively for each of said scan lines, and said wall filter is further programmed with fifth and sixth sets of filter coefficients to bandpass respective harmonic signal components of said fifth and sixth receive signals for summing with said compressed and bandpassed first through fourth fundamental signal components and the selectively passed frequencies for each of said scan lines in each of said scan planes while substantially canceling respective fundamental signal components of said fifth and sixth receive signals.

12. The system as recited in claim 7, wherein said transducer elements comprise piezoelectric elements for transmitting ultrasound waves in response to electrical activation and for transducing returned ultrasound waves into electrical signals.

13. An imaging system comprising:
  a transducer array having a multiplicity of transducer elements for transmitting wave energy centered at a fundamental frequency in response to electrical activation and for transducing returned wave energy into electrical signals;
  a display monitor for displaying an image; and
  a computer programmed to perform the steps of:
    (a) activating transducer elements of said array to transmit focused wave energy encoded with a transmit code during first and second transmit events for each of a multiplicity of transmit focal positions in each of a multiplicity of scan planes;
    (b) forming first and second receive signals from electrical signals produced by said transducer elements subsequent to said first and second transmit events respectively for each of a multiplicity of scan lines in each of said scan planes;
    (c) compressing, bandpassing and wall filtering first and second fundamental signal components of said first and second receive signals respectively to form a flow signal for each of said scan lines in each of said scan planes;
(d) storing a respective set of flow signals for each of said scan planes to form a data volume;
(e) generating imaging data representing a three-dimensional projection of said data volume having a controllable orientation onto an imaging plane by applying a projection transformation to said data volume; and
(f) sending said imaging data representing a three-dimensional projection to said display monitor.

14. The system as recited in claim 13, wherein said computer includes an FIR filter and a vector summer coupled to said FIR filter for performing step (c).

15. The system as recited in claim 13, wherein said transducer elements comprise piezoelectric elements for transmitting ultrasound waves in response to electrical activation and for transducing returned ultrasound waves into electrical signals.

16. An imaging system comprising:
a transducer array having a multiplicity of transducer elements for transmitting wave energy centered at a fundamental frequency in response to electrical activation and for transducing returned wave energy into electrical signals;
a display monitor for displaying an image; and
a computer programmed to perform the steps of:
(a) activating transducer elements of said array to transmit focused wave energy encoded with a first Golay code of a Golay code pair during first and third transmit events and to transmit focused wave energy encoded with a second Golay code of said Golay code pair during second and fourth transmit events for each of a multiplicity of transmit focal positions in each of a multiplicity of scan planes;
(b) forming first through fourth receive signals from electrical signals produced by said transducer elements subsequent to said first through fourth transmit events respectively for each of a multiplicity of scan lines in each of said scan planes;
(c) decoding, bandpassing and wall filtering first through fourth fundamental signal components of said first through fourth receive signals respectively to form a flow signal for each of said scan lines in each of said scan planes;
(d) storing a respective set of flow signals for each of said scan planes to form a data volume;
(e) generating imaging data representing a three-dimensional projection of said data volume having a controllable orientation onto an imaging plane by applying a projection transformation to said data volume; and
(f) applying said imaging data representing a three-dimensional projection to said display monitor.

17. The system as recited in claim 16, wherein said computer includes an FIR filter and a vector summer coupled to said FIR filter for performing said step (c).

18. The system as recited in claim 16, wherein said transducer elements comprise piezoelectric elements for transmitting ultrasound waves in response to electrical activation and for transducing returned ultrasound waves into electrical signals.

19. A method for imaging flow of blood in a body, comprising the steps of:
transmitting N encoded focused beams of wave energy having a fundamental frequency for each of a multiplicity of transmit focal positions in each of a multiplicity of scan planes intersecting the body, where $N \geq 2$;
generating echo signals derived from echoes of wave energy returned from the body following each transmission of a focused beam for each of a multiplicity of scan lines in each of said scan planes;
filtering a fundamental signal component for each of said echo signals to form a flow signal indicative of blood flow for each of said scan lines in each of said scan planes;
storing a respective set of flow signals for each of said scan planes to form a data volume;
generating imaging data representing a three-dimensional projection of said data volume having a controllable orientation onto an imaging plane; and
displaying an image as a function of said three-dimensional projection.

20. The method as recited in claim 19, further comprising the step of injecting a contrast agent into the body prior to the step of transmitting.

21. The method as recited in claim 19, wherein the step of filtering comprises compressing, band-passing and wall filtering said fundamental signal component.

22. A system for imaging flow of blood in a body, comprising:
a transducer array having a multiplicity of transducing elements;
a transmitter for activating said transducer array to transmit N encoded focused beams of wave energy having a fundamental frequency for each of a multiplicity of transmit focal positions in each of a multiplicity of scan planes intersecting the body, where $N \geq 2$;
a receiver for receiving echo signals derived from echoes of wave energy returned from the body to said transducer array following each transmission of a focused beam for each of a multiplicity of scan lines in each of said scan planes;
a filter for filtering a fundamental signal component for each of said echo signals to form a flow signal indicative of blood flow for each of said scan lines in each of said scan planes;
a memory for storing a respective set of flow signals for each of said scan planes to form a data volume;
a computer programmed to generate first imaging data representing a three-dimensional projection of said data volume having a controllable orientation onto an imaging plane in a first imaging mode; and
a display subsystem for displaying an image as a function of said three-dimensional projection.

23. The system as recited in claim 22, wherein said computer includes an FIR filter, a vector summer coupled to said FIR filter, and a filter coefficient memory for providing filter coefficients to said FIR filter, said filter coefficients being selected to compress and bandpass said fundamental signal component and, in combination with said vector summer, to wall filter the compressed and bandpassed fundamental signal component.

24. The system as recited in claim 22, wherein said computer is further programmed to generate second imaging data representing a slice through said data volume in a second imaging mode.

25. The system as recited in claim 22, further comprising an operator interface for selecting said orientation of said data volume.

26. A method of operating an imaging system including a multiplicity of transducer elements for transmitting wave energy in response to electrical activation and for transducing returned wave energy into electrical signals, and a display monitor for displaying an image, said method comprising the steps of:
- (a) activating transducer elements of said array to transmit encoded focused wave energy during first through N-th transmit events for each of a multiplicity of transmit focal positions in each of a multiplicity of scan planes;
- (b) forming first through N-th receive signals from electrical signals produced by said plurality of transducer elements subsequent to said first through N-th transmit events, respectively, for each of a multiplicity of scan lines in each of said scan planes;
- (c) compressing, bandpassing and wall filtering first through N-th fundamental signal components of said first through N-th receive signals, respectively, to form a respective flow signal for each of said scan lines in each of said scan planes;
- (d) storing a respective set of flow signals for each of said scan planes to form a data volume;
- (e) generating imaging data representing a three-dimensional projection of said data volume having a controllable orientation onto an imaging plane by applying a projection transformation to said data volume; and
- (f) displaying an image as a function of said three-dimensional projection.

27. The method as recited in claim 26, wherein the wave energy is encoded with a predetermined transmit code for each of said first through N-th transmit events.

28. The method as recited in claim 26, wherein the wave energy is encoded with a first Golay code of a Golay code pair during one half of said first through N-th transmit events, and is encoded with a second Golay code of said Golay code pair during the other half of said first through N-th transmit events.

29. An ultrasound diagnostic system for displaying three-dimensional images of stationary and moving reflectors for an area of interest in a patient, comprising:
- a transmitter for transmitting multiple sequences of at least two B-mode pulses to a volume of interest, wherein said at least two B-mode pulses in at least one sequence are transmitted to a common transmit focal position;
- a receiver for receiving B-mode echo signals containing a fundamental frequency component and being associated with said B-mode pulses, said B-mode echo signals defining a three-dimensional data volume containing B-mode and B-mode flow information;
- a filter for receiving said B-mode echo signals and, based thereon, producing a filtered output signal containing flow image information for moving reflectors in said three-dimensional data volume, said filtered signal containing B-mode information for stationary reflectors in said three-dimentional data volume, said B-mode information for stationary reflectors including said fundamental frequency component; and
- a display for displaying a three-dimensional image comprising a B-mode flow image component of moving reflectors and a B-mode image component of stationary reflectors based on said filtered output signal.

30. The system of claim 29, further comprising:
- a three-dimensional B-mode flow processor for forming a projection representative of a three-dimensional B-flow image based on said filtered output signal.

31. The system of claim 30, wherein said display is adapted to display three-dimensional B-mode and three-dimensional B-mode flow information summed with one another as said B-flow image.

32. An ultrasound imaging system comprising:
- a transmitter for transmitting focused wave energy encoded with a transmit code during first and second transmit events for each of a multiplicity of transmit focal positions in each of a multiplicity of scan planes;
- a receiver for forming first and second receive signals from said first and second transmit events, respectively, for each of a multiplicity of scan lines in each of said scan planes;
- a filter for forming a flow signal from said first and second receive signals for each of said scan lines in each of said scan planes, a first flow signal being based on a weighted sum of said first and second receive signals;
- a computer for generating imaging data representing a three-dimensional projection of a data volume containing a set of flow signals for each scan plane; and
- a display for displaying a three-dimensional image which is a function of said three-dimensional projection.

33. The system of claim 32, wherein said filter comprises a wall filter programmed with first and second sets of filter coefficients to compress and bandpass first and second signal components of said first and second receive signals, respectively.

34. The system of claim 32, wherein the filter is adapted to selectively pass frequencies corresponding to wave energy from moving reflectors.

35. The system of claim 32, wherein said filter is adapted to derive said flow signals from compressed and bandpassed first and second fundamental signal components of said first and second received signals, respectively.

36. The system of claim 32, wherein said filter is adapted to derive said flow signals from selectively passed frequencies of said first and second received signals.

37. The system of claim 32, further comprising:
- a memory for storing a respective set of flow signals for each of said scan planes to form a data volume.

38. An ultrasound imaging system comprising:
- a transmitter for transmitting broadband focused wave energy encoded with a first Golay code of a Golay code pair during first and third transmit events and for transmitting broadband focused wave energy encoded with a second Golay code of said Golay code pair during second and fourth transmit events for each of a multiplicity of transmit focal positions in each of a multiplicity of scan planes;
- a receiver for forming first through fourth receive signals from said first through fourth transmit events, respectively, for each of a multiplicity of scan lines in each of said scan planes;
- a filter for forming a flow signal from said first through fourth receive signals for each of said scan lines in each of said scan planes;
- a computer for generating imaging data representing a three-dimensional projection of a set of flow signals forming a data volume; and
- a display for displaying an image which is a function of said three-dimensional projection.

39. A method for three-dimensional imaging of stationary and moving reflectors in a body, comprising the steps of:
- transmitting at least two broadband encoded focused beams of wave energy for each of a multiplicity of transmit focal positions in each of a multiplicity of scan planes intersecting the body;

generating echo signals derived from echoes of wave energy returned from the body following each transmission of a focused beam for each of a multiplicity of scan lines in each of said scan planes;

forming a B-mode flow signal component and a B-mode signal component indicative of moving reflectors and stationary reflectors, respectively, for each of said scan lines in each of said scan planes based on said echo signals;

generating imaging data representing a three-dimensional projection of a data volume formed from said B-mode flow and B-mode signal components; and displaying a three-dimensional image of stationary and moving reflectors as a function of said three-dimensional projection.

40. A method of operating an imaging system, comprising the steps of:

(a) transmitting encoded focused wave energy during first through N-th transmit events for each of a multiplicity of transmit focal positions in each of a multiplicity of scan planes;

(b) forming first through N-th receive signals from said first through N-th transmit events for each of a multiplicity of scan lines in each of said scan planes;

(c) filtering said first through N-th receive signals based on a weighting sum to form a respective flow signal for each scan line in each of said scan planes;

(d) generating imaging data representing a three-dimensional projection of a data volume defined by the respective flow signals; and (e) displaying an image as a function of said three-dimensional projection.

* * * * *